United States Patent
Iwamoto

(10) Patent No.: US 8,057,055 B2
(45) Date of Patent: Nov. 15, 2011

(54) LIGHT SOURCE HOLDING STRUCTURE, A LIGHT SOURCE HOLDING MEMBER, A LIGHT SOURCE HOLDING UNIT, AND A DISPLAY DEVICE

(75) Inventor: Kenichi Iwamoto, Kobe (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 12/440,290

(22) PCT Filed: Jun. 6, 2007

(86) PCT No.: PCT/JP2007/061451
§ 371 (c)(1),
(2), (4) Date: Mar. 6, 2009

(87) PCT Pub. No.: WO2008/029545
PCT Pub. Date: Mar. 13, 2008

(65) Prior Publication Data
US 2009/0279282 A1 Nov. 12, 2009

(30) Foreign Application Priority Data
Sep. 7, 2006 (JP) ................................. 2006-243444

(51) Int. Cl.
*F21V 19/00* (2006.01)
*G02F 1/13357* (2006.01)

(52) U.S. Cl. ....... 362/97.1; 362/634; 362/218; 362/225; 362/217.08; 362/217.14

(58) Field of Classification Search ................ 362/97.1, 362/218, 225, 217.08–217.13, 396, 634, 362/217.14
See application file for complete search history.

(56) References Cited

U.S. PATENT DOCUMENTS

| 6,793,381 B2 | 9/2004 | Marsh |
| 7,434,957 B2 | 10/2008 | Kim et al. |
| 7,600,889 B2 * | 10/2009 | Fukuda ......................... 362/225 |
| 2009/0154140 A1 * | 6/2009 | Aoki et al. .................... 362/97.2 |
| 2009/0196019 A1 * | 8/2009 | Hsiao et al. .................. 362/97.2 |

FOREIGN PATENT DOCUMENTS

| CN | 1721946 A | 1/2006 |
| CN | 100529890 C | 8/2009 |

(Continued)

OTHER PUBLICATIONS

Official Communication issued in International Patent Application No. PCT/JP2007/061451, mailed on Jul. 3, 2007.

*Primary Examiner* — Stephen F Husar
*Assistant Examiner* — James Cranson, Jr.
(74) *Attorney, Agent, or Firm* — Keating & Bennett, LLP

(57) ABSTRACT

A light source holding structure eliminates non-uniformity of temperature distribution of a tube body of a light source in order to make uniform the amount of light emitted or prevent portions at which the amount of light emitted is locally lowered. The light source holding structure has a linear light source and a first light source holding member substantially in the shape of a bar. An engaging groove arranged to engage with a portion of a tube body of the light source is provided on the front side of the first light source holding member. The portion of the tube body is engaged in the engaging groove and substantially the entire length of the tube body is brought into surface contact with the inner surface of the engaging groove.

21 Claims, 19 Drawing Sheets

FOREIGN PATENT DOCUMENTS

| | | |
|---|---|---|
| JP | 4-9026 U | 1/1992 |
| JP | 2000-285867 A | 10/2000 |
| JP | 2004-318176 A | 11/2004 |
| JP | 2004-348150 A | 12/2004 |
| JP | 2005-251479 A | 9/2005 |
| JP | 2006-032080 A | 2/2006 |

* cited by examiner

LIGHT SOURCE HOLDING STRUCTURE, A LIGHT SOURCE HOLDING MEMBER, A LIGHT SOURCE HOLDING UNIT, AND A DISPLAY DEVICE

BACKGROUND OF THE INVENTION

1. Field of the Invention

The present invention relates to a light source holding structure, a light source holding member, a light source unit, and a display device. More specifically, the present invention relates to a light source holding structure to be incorporated in a light source unit for a display device such as a liquid crystal display device, a light source holding member which can be used in the light source holding structure, a light source unit using the light source holding structure, and a display device.

2. Description of the Related Art

A display device having a non-self-emissive display panel such as a translucent liquid crystal display panel generally has a configuration such that a light source unit in which a light source is incorporated is provided on a back side or a lateral side of the display panel. For the light source which is incorporated in the light source unit, a substantially linear or substantially U-shaped fluorescent tube is widely used. A light source clip is used for fixing the light source to a chassis of the light source unit (see Japanese Patent Application Unexamined Publication No. 2004-348150).

FIG. 19 is an exploded perspective view schematically showing a conventional example of the configuration of the relevant portion of a light source unit for a display device in which a plurality of light sources are incorporated. A light source unit 9 for a display device in FIG. 19 has a chassis 91, a plurality of linear light sources 93, a plurality of light source clips 92 for fixing the light sources 93 to the chassis 91, and other given constituent elements.

Each of the light source clips 92 has light source holding portions capable of holding tube bodies of the light sources 93 and a locking portion for attaching the clip 92 to the chassis 91. A plurality of through holes (not shown) are provided in given positions on a bottom plate of the chassis 91. The locking portions of the light source clips 92 are caught in the through holes, by which the light source clips 92 can be attached to the chassis 91. In addition, the tube bodies of the light sources 93 are held at one or some positions by the light source holding portions of the light source clips 92, by which the light sources 93 can be fixed to the chassis 91.

However, the following problems could arise when the light sources 93 are fixed to the chassis 91 by holding the tube bodies of the light sources 93 at one or some positions by the light source clips 92 as described above.

It is a known characteristic of fluorescent tubes used as the light sources that when temperature distribution of tube bodies of the fluorescent tubes becomes non-uniform during the use of the fluorescent tubes, the amount of light emitted by the fluorescent tubes also becomes non-uniform depending on the temperature distribution. To be specific, the amount of light emitted becomes larger in high temperature portions of the tube bodies and becomes smaller in low temperature portions of the tube bodies.

When the material of the light source clips 92 has higher thermal conductivity than air, heat of the light sources 93 is easily transferred to the chassis 91 through the light source clips 92. Thus, the temperatures of the light sources 93 are locally lowered in the portions at which the light sources 93 are held by the light source clips 92 and in the vicinities of the portions as compared to the other portion. As a result, the amount of light emitted is locally lowered in the portions at which the light sources 93 are held by the light source clips 92 and in the vicinities of the portions as compared to the other portion.

If the light sources 93 have portions at which the amount of light emitted is locally lowered, lower luminance portions could appear locally on a display screen (i.e., luminance irregularity could occur) when the light source unit 9 is incorporated in and used in the display device. Because such luminance irregularity decreases display quality of the display device, it is preferably prevented or minimized.

There is proposed a configuration in which the light source clips are arranged in a zigzag pattern on the chassis in order that luminance irregularity may be made less noticeable (see Japanese Patent Application Unexamined Publications Nos. 2004-348150 and 2004-318176). This configuration prevents portions at which the luminance is locally lowered due to radiation of heat through the light source clips from being aligned linearly in a specific direction. Thus, luminance irregularity can be made less noticeable even if the light sources have portions at which the luminance is locally lowered.

However, the above configuration is effective for making low luminance portions less noticeable but not for preventing the light sources from having portions at which the amount of light emitted is locally lowered. In accordance with a recent increase in the size of the display panel, the length of the fluorescent tubes to be used as the light sources becomes longer. Accordingly, in order not to break the light sources to be incorporated in the light source unit, it is necessary to increase the number of positions at which the tube bodies of the light sources are held by the light source clips. By doing so, the number of lower luminance portions on the display screen is increased, and the lower luminance portions could become easily noticeable.

SUMMARY OF THE INVENTION

In order to overcome the problems described above, preferred embodiments of the present invention provide a light source holding structure which eliminates non-uniformity of temperature distribution of a tube body in order to make uniform the amount of light emitted or prevent portions at which the amount of light emitted is locally lowered, a light source holding member which can be used in the light source holding structure, a light source unit using the light source holding structure, and a display device.

According to a preferred embodiment of the present invention, a linear light source is held by a light source holding member, and at least a portion of an outer surface of substantially the entire length of the linear light source is in contact with the light source holding member. It is preferable that the linear light source is in surface contact with the light source holding member.

The linear light source may be held by one light source holding member or by a plurality of light source holding members. It is preferable that the length of one light source holding member in the longer direction is substantially equal to the length of the linear light source, one linear light source is held by one light source holding member of such a length, and the entire length of the linear light source is in contact with the one light source holding member. It is also preferable that the length of one light source holding member in the longer direction is shorter than the length of the linear light source, the light source holding member of such a length is provided in a plurality, the plurality of light source holding members are arranged in series, and one light source is held by the plurality of light source holding members. In this case, substantially the entire length of one light source preferably is in contact with the plurality of light source holding members.

It is preferable that the contact area between the outer surface in the end portion of the linear light source and the light source holding member is larger than the contact area between the outer surface in the other portion of the linear light source and the light source holding member.

According to another preferred embodiment of the present invention, a light source holding member which can be used in such a light source holding structure is substantially in the shape of a bar and has a concave engaging groove extending substantially the entire length of the light source holding member in the longer direction and capable of engaging with at least a portion of the outer surface of a linear light source. It is preferable that the depth of the engaging groove in the end portion of the light source holding member in the longer direction is deeper than the depth in the other portion.

It is also preferable that the light source holding member further has a side wall at the side of the engaging groove, and that the side wall is arranged to lock the linear light source. One side wall may extend along substantially the entire length of the light source holding member in the longer direction. Alternatively, a plurality of side walls may be continuously provided with a given pitch along substantially the entire length of the light source holding member in the longer direction.

It is also preferable that the contact area between the side wall and the outer surface in the end portion of the linear light source is larger than the contact area between the side wall and the outer surface in the other portion. For example, the depth of the side wall in the end portion of the light source holding member in the longer direction is preferably deeper than the depth in the other portion. In the case of continuously providing the plurality of side walls, the length of the side walls in the end portion of the light source holding member in the longer direction is preferably longer than the length of the side walls in the other portion. Alternatively, the pitch of the side walls in the end portion of the light source holding member in the longer direction may be smaller than the pitch of the side walls in the other portion.

According to another preferred embodiment of the present invention, a light source holding member for holding a linear light source has a base substantially in the shape of a bar and a plurality of locking portions capable of elastically engaging with the outer surface of the linear light source, and the plurality of locking portions are continuously provided along substantially the entire length of the light source holding member in the longer direction.

It is preferable that the contact area between the locking portions and the outer surface in the end portion of the linear light source is larger than the contact area between the locking portions and the outer surface in the other portion of the light linear light source. For example, the length of one or some of the locking portions in the end portion of the base in the longer direction is preferably longer than the length of the locking portions in the other portion. Alternatively, the pitch of the locking portions in the end portion of the base in the longer direction may be smaller than the pitch of the locking portions in the other portion.

It is preferable that the light source holding member is a unitary molded member made of a resin material, for example.

In addition, the light source holding member may have a heat conduction member arranged to transfer heat in the end portion of the linear light source to the central portion. To be specific, the heat conduction member is preferably embedded in the light source holding member and has exposed portions in the end portion and an approximately central portion of the light source holding member in the longer direction, the exposed portions being arranged to contact the outer surface of the held linear light source.

According to the preferred embodiments of the present invention in which substantially the entire length of the linear light source is in contact with the light source holding member, heat of the light source is transferred to the light source holding member through substantially the entire length of the light source. Thus, the light source does not have portions at which the temperatures are locally lowered. As a result, the amount of light emitted can be made uniform substantially over the entire length of the light source.

The linear light source may be held by one light source holding member or by a plurality of light source holding members. In the case of holding one light source by one light source holding member, the number of processes for fixing the light source can be reduced because the number of components is reduced. In the case of holding one light source by a plurality of light source holding members, the length of the light source holding member can be shortened, and an increase in the production cost of the light source holding member can be prevented. In addition, common use of the light source holding members in the case of using light sources of various lengths is allowed.

Owing to the configuration in which the contact area between the outer surface in the end portion of the linear light source and the light source holding member is larger than the contact area between the outer surface in the other portion of the linear light source and the light source holding member, high temperature portions of the light source can be significantly cooled, and the temperature difference along the enter length of the light source can be decreased.

The light source holding members having the heat conduction member arranged to transfer heat in the end portion of the light source to the central portion can also reduce the temperature difference along the entire length of the light source.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 3 shows a state of the light sources being fixed to the chassis by the first light source holding members.

FIG. 15 is an exploded perspective view schematically showing the configuration of the chassis and the light source holding member.

DETAILED DESCRIPTION OF THE PREFERRED EMBODIMENTS

A detailed description of preferred embodiments of the present invention will now be given with reference to the accompanying drawings.

Figure 1:
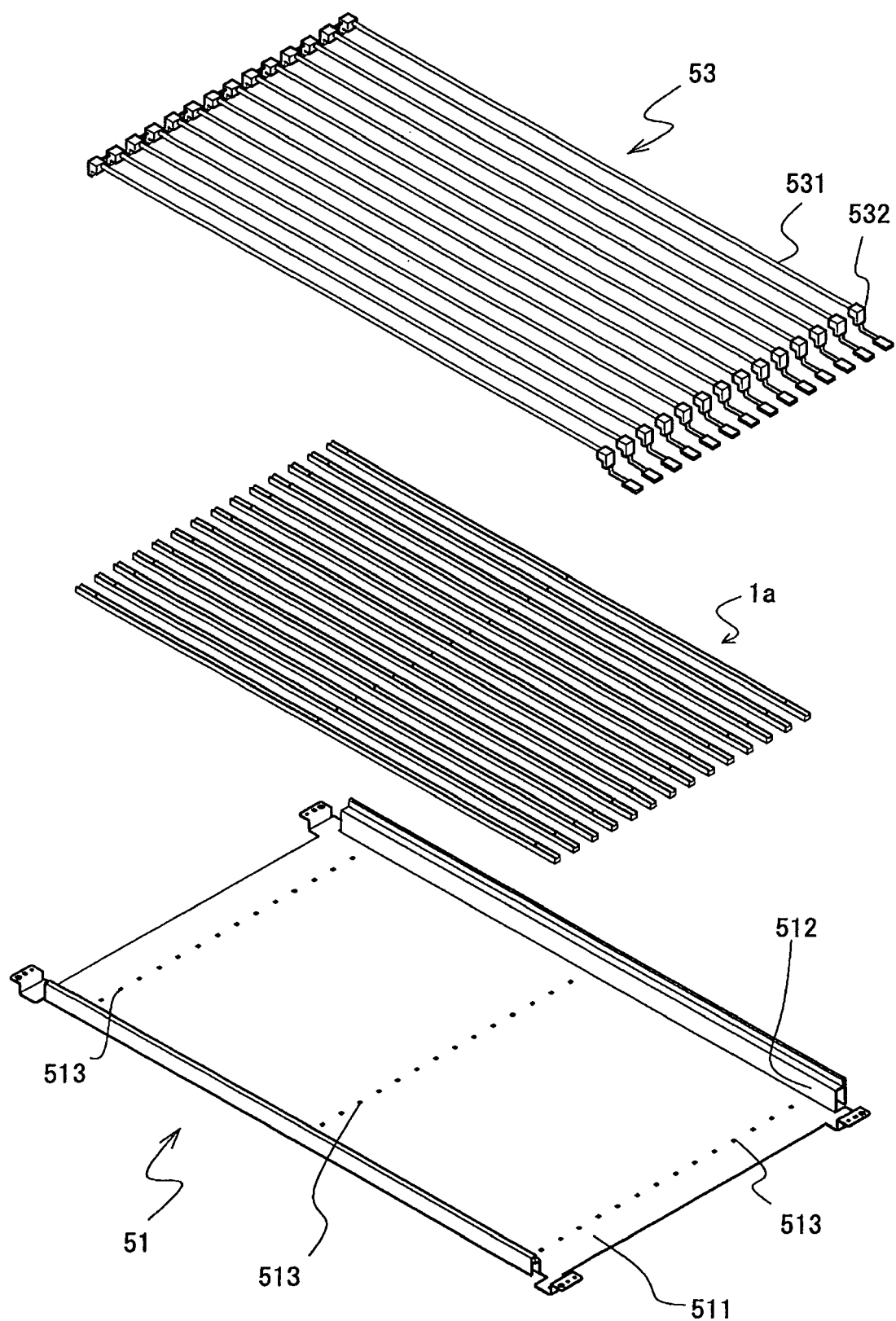
FIG. 1 is an exploded perspective view of a light source unit for a display device using a light source holding structure according to a preferred embodiment of the present invention, showing only light sources, first light source holding members, and a chassis.

FIG. 1 is an exploded perspective view of a light source unit for a display device using a light source holding structure according to a preferred embodiment of the present invention, showing only light sources 53, first light source holding members 1a, and a chassis 51. The light source holding structure according to the present preferred embodiment of the present invention is used for fixing the linear light sources 53 to the chassis 51. In FIG. 1, the front sides of the first light source holding members 1a and the chassis 51 face toward the top of FIG. 1, and the back sides thereof face toward the bottom of FIG. 1.

For the light sources 53, conventional fluorescent tubes such as cold cathode tubes and hot cathode tubes may preferably used. The light sources 53 have substantially circular cylindrical tube bodies 531 and electrodes (not shown) at both end portions of the tube bodies 531. Mercury and rare gases are sealed in the tube body 531, and a phosphor thin film (not shown) is formed on the inner wall surface of the tube body 531. In FIG. 1, substantially linear fluorescent tubes are used as the tube bodies 531. Rubber holders 532 are attached to both ends of the tube bodies 531 of the light sources 53. A detailed description of the light sources 53 is omitted.

The first light source holding members 1a are substantially in the shape of a bar. On the front side, the first light source holding members 1a are arranged to hold the light sources 53. On the back side, the first light source holding members 1a have first locking portions 12 capable of locking the chassis 51. A detailed description of the configuration of the first light source holding members 1a will be given later.

The chassis 51 of the light source unit preferably has a shape of a substantially square, shallow tray. The chassis 51 is preferably prepared by subjecting a metal plate material to press working. As shown in FIG. 1, the chassis 51 has a substantially square bottom plate 511 and side walls 512 rising from the bottom plate 511. A plurality of locking holes 513 are provided in given positions on the bottom plate 511 of the chassis 51. The locking holes 513 are capable of catching the first locking portions 12 on the back side of the first light source holding members 1a.

Figure 2:
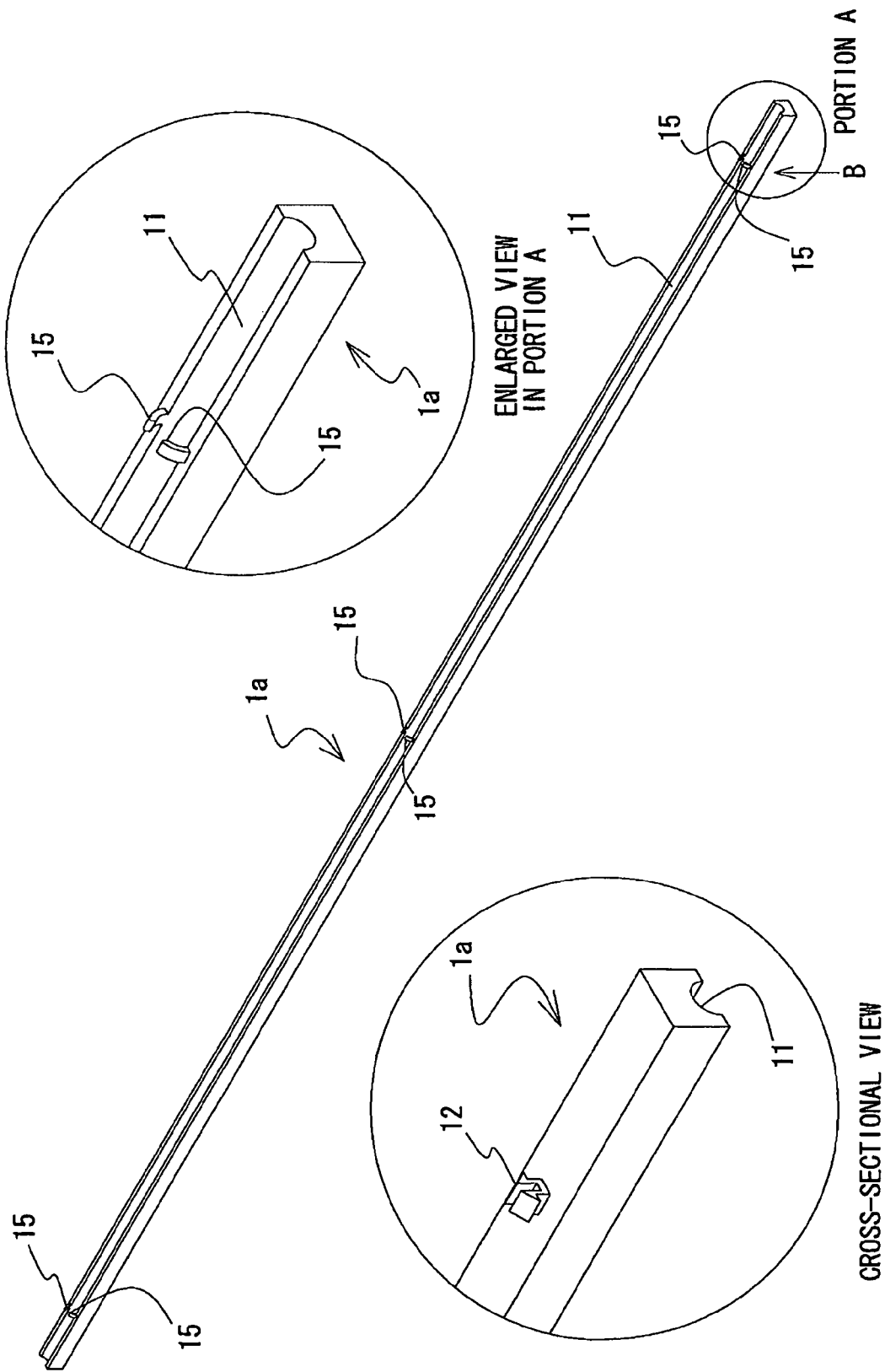
FIG. 2 is an external perspective view schematically showing the overall configuration of the first light source holding member which can be used in the light source holding structure according to a preferred embodiment of the present invention, including a partial enlarged view showing the first light source holding member in the portion A and a cross-sectional enlarged view in the direction of the arrow B showing the configuration of a first locking portion on the back side of the first light source holding member.

FIG. 2 is an external perspective view showing the overall configuration of the first light source holding member 1a, including a partial enlarged view of the first light source holding member 1a in the portion A and across-sectional enlarged view in the direction of the arrow B showing the configuration of the first locking portion 12 on the back side of the first light source holding member 1a.

As shown in FIG. 2, the first light source holding member 1a is substantially in the shape of a bar. Material of the first light source holding member 1a is not limited, and a resin material such as ABS resin and polypropylene is suitably used, for example. The first light source holding member 1a is preferably substantially transparent or substantially white.

On the front side, the first light source holding member 1a has an engaging groove 11 extending the entire length of the first light source holding member 1a in the longer direction and capable of engaging with the tube body 531 of the light source 53. The engaging groove 11 is substantially in the shape of a semicircle in cross section, and the radius of curvature of the inner surface of the engaging groove 11 is preferably substantially equal to the radius of curvature of the outer surface of the tube body 531 of the light source 53. Thus, the engaging groove 11 can engage with the tube body 531 of the light source 53. When the tube body 531 of the light source 53 is engaged in the engaging groove 11, a region of the outer surface of the tube body 53 of the light source 53, which is engaged in the engaging groove 11, is brought into surface contact with the inner surface of the engaging groove 11.

The length of the first light source holding member 1a is preferably set such that substantially the entire length of the tube body 531 of the light source 53 can be engaged in the engaging groove 11 (e.g., the length of the first light source holding member 1a is preferably set to be substantially equal to the length of the tube body 531). Thus, substantially the entire length of the tube body 531 of the light source 53 is brought into contact with the first light source holding member 1a. Heat of the tube body 531 of the light source 53 is transferred to the first light source holding member 1a through the region which is brought into surface contact with the inner surface of the engaging groove 11.

The depth of the engaging groove 11 is preferably set as appropriate in accordance with use conditions of the light source 53. To be specific, the amount of light emitted by the light source 53 changes according to the temperature of the tube body 531, and the temperature of the tube body 531 is influenced by the amount of heat which is transferred from the tube body 531 to the first light source holding member 1a. The amount of heat which is transferred from the tube body 531 to the first light source holding member 1a changes according to the contact area between the outer surface of the tube body 531 and the inner surface of the engaging groove 11. If the depth of the engaging groove 11 is increased, the contact area between the outer surface of the tube body 531 and the inner surface of the engaging groove 11 is increased. If the depth of the engaging groove 11 is decreased, the contact area is decreased. As described above, the depth of the engaging groove 11 has an influence on the state of light emitted by the light source 53. Thus, the depth of the engaging groove 11 is set as appropriate in accordance with use conditions in order that the light source 53 can emit light in the most appropriate state during the use of the light source unit (i.e., in order that the most appropriate temperature can be maintained).

On the front side, the first light source holding member 1a has second locking portions 15. The second locking portions 15 prevent the tube body 531 being engaged in the engaging groove 11 from coming off the engaging groove 11. The second locking portions 15 are preferably in the shape of a tongue and are provided on the front side of the first light source holding member 1a. The second locking portions 15 cover at least a portion of the front side of the tube body 531 being engaged in the engaging groove 11. Specifically, the second locking portions 15 are preferably located toward the front side of the engaging groove 11 and inwardly curve from the base ends toward the top ends.

The second locking portions 15 may be or may not be brought into contact with the outer surface of the tube body 531 being engaged in the engaging groove 11. The position and number of second locking portions 15 are not limited. It is essential only that the tube body 531 being engaged in the engaging groove 11 may not come off the engaging groove 11 spontaneously (e.g., by self weight of the light source 53).

On the backside, the first light source holding member 1a has the first locking portions 12. The first locking portions 12 have the function of fixing the first light source holding member 1a to the chassis 51 by being caught in the locking holes 513 of the bottom plate 511 of the chassis 51. The configuration of the first locking portions 12 is not specifically limited if the first locking portions 12 are capable of fixing the first light source holding member 1a to the chassis 51. For example, the first locking portion 12 may be a split pin as shown in the cross-sectional enlarged view in the direction of the arrow B of FIG. 2.

Figure 3:
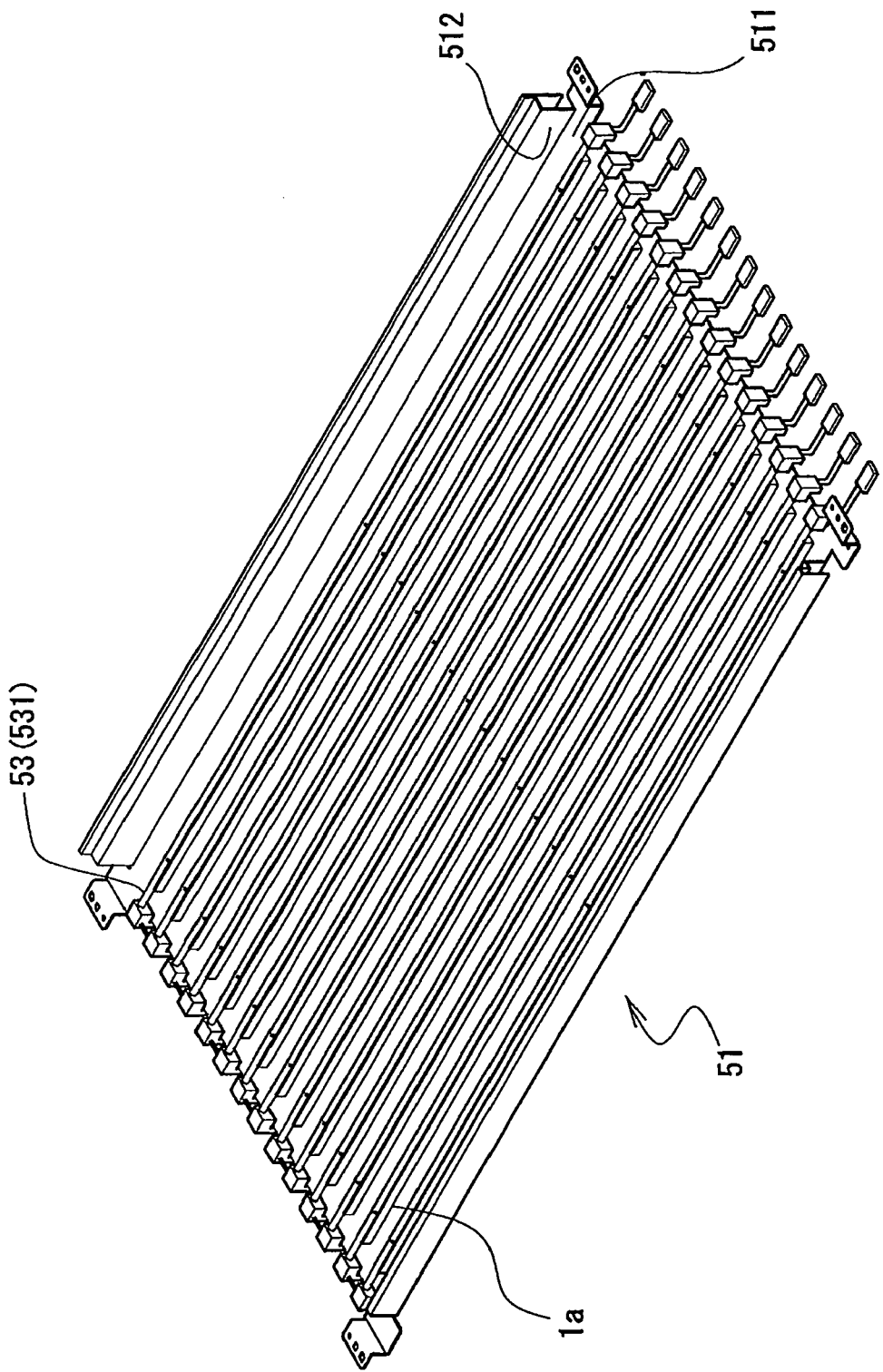
FIG. 3 is an external perspective view schematically showing the light source holding structure according to a preferred embodiment of the present invention, and more specifically.

FIG. 3 is an external perspective view showing the state of the light sources 53 being fixed to the chassis 51 by the first light source holding members 1a. Though optical members such as a reflection sheet (i.e., a sheet-shaped member having the function of diffusely reflecting light emitted by light sources) are actually provided between the bottom plate 511 of the chassis 51 and the first light source holding members 1a, they are omitted from illustration in FIG. 3.

As shown in FIG. 3, the first light holding members 1a are attached to the front side of the bottom plate 511 of the chassis 51, and the tube bodies 531 of the light sources 53 are engaged in the engaging grooves 11 of the attached first light source holding members 1a. For attaching the first light source holding members 1a to the front side of the bottom plate 511 of the chassis 51, the first locking portions 12 on the back side of the first light source holding members 1a are inserted through the corresponding locking holes 513 of the bottom plate 511 of the chassis 51 to be caught by the rims of the locking holes 513. In addition, for engaging the tube bodies 531 of the light sources 53 in the engaging grooves 11 of the first light source holding members 1a, the second locking portions 15 on the front side of the first light source holding members 1a are elastically deformed to widen the spaces between the second locking portions 15, and the tube bodies 531 of the light sources 53 are inserted through the widened spaces.

Owing to such a configuration, substantially the entire lengths of the tube bodies 531 of the light sources 53 are brought into contact with the first light source holding members 1a, and they are held by the chassis 51 in that state. Thus, heat of the tube bodies 531 of the light sources 53 is transferred to the first light source holding members 1a through substantially the entire lengths of the tube bodies 531. Accordingly, the tube bodies 531 of the light sources 53 do not have portions at which the temperatures are locally lowered. As a result, the amount of light emitted by the light sources 53 can be made uniform substantially over the entire lengths of the tube bodies 531.

The above configuration also provides excellent impact resistance with the light sources 53. Because substantially the entire lengths of the tube bodies 531 are engaged in the engaging grooves 11, an external impactive force on the chassis 51 is distributed substantially over the entire lengths of the tube bodies 531, and large forces are not exerted on specific portions of the tube bodies 51. Thus, damage and destruction of the tube bodies 531 can be prevented or minimized even if an external impactive force is exerted on the chassis 51.

Because substantially the entire lengths of the tube bodies 531 of the light sources 53 are held by the first light source holding members 1a, vibrations of the light sources 53 can be prevented or minimized.

Light source holding members which can be used in the light source holding structure according to a preferred embodiment of the present invention are not limited to the light source holding members having the above configuration. Descriptions of modified examples of the light source holding members will be given herein after. Constituent elements of the light source holding members to be described below, which are common to the first light source holding members 1a, are given the same names and assigned the same reference numerals as the corresponding constituent elements of the first light source holding members 1a.

Figure 4:
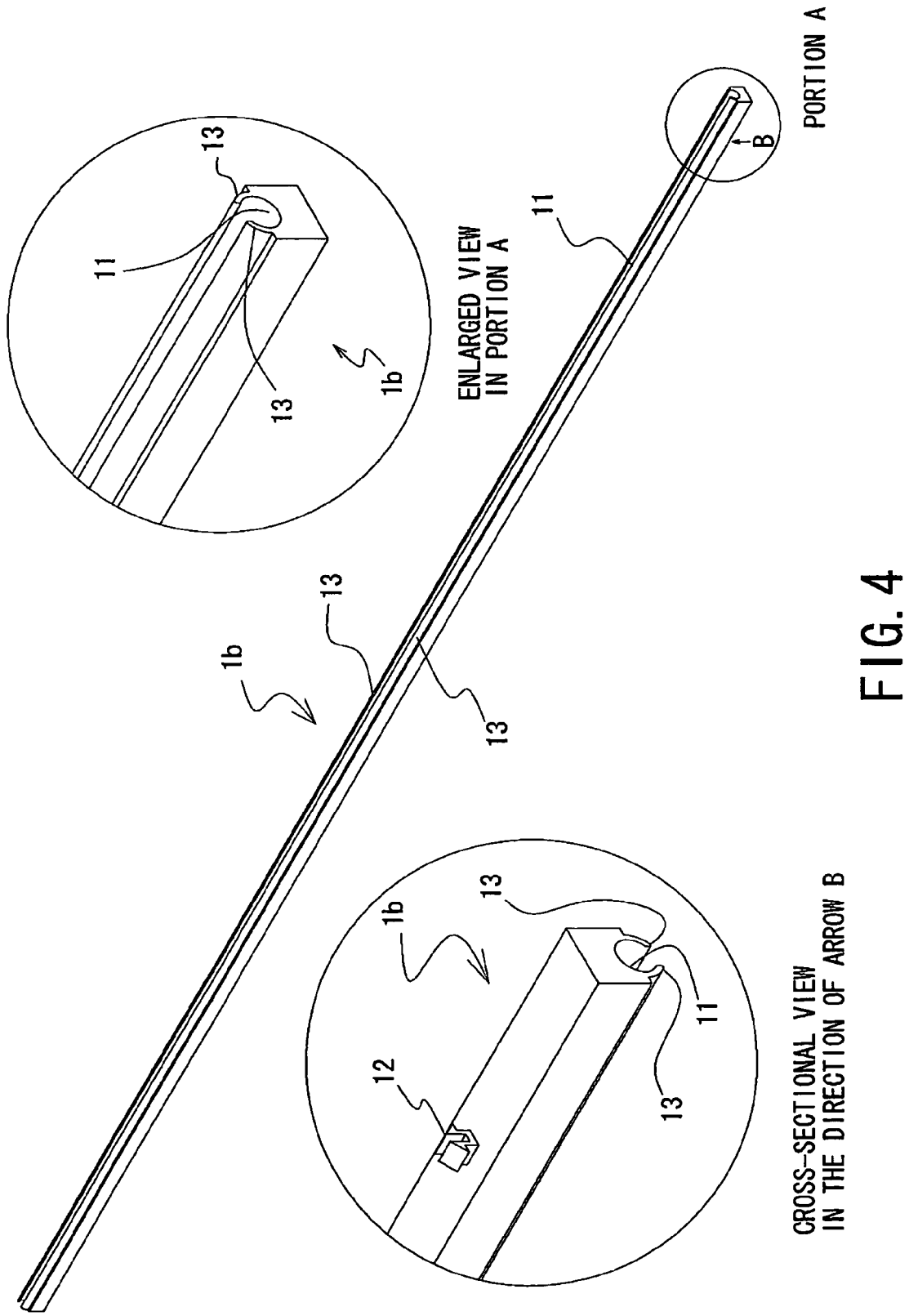
FIG. 4 is an external perspective view schematically showing the overall configuration of a second light source holding member which can be used in the light source holding structure according to a preferred embodiment of the present invention, including a partial enlarged view showing the second light source holding member in the portion A and a cross-sectional enlarged view in the direction of the arrow B showing the configuration of the first locking portion on the back side of the second light source holding member.

FIG. 4 is an external perspective view showing the overall configuration of a second light source holding member 1b, including a partial enlarged view of the second light source holding member 1b in the portion A and a cross-sectional enlarged view in the direction of the arrow B showing the configuration of the first locking portion 12 on the back side of the second light source holding member 1b.

As shown in FIG. 4, the second light source holding member 1b is substantially in the shape of a bar. On the front side, the second light source holding member 1b has the engaging groove 11 extending substantially the entire length of the second light source holding member 1b in the longer direction and capable of engaging with the tube body 531 of the light source 53. The engaging groove 11 is substantially in the shape of a semicircle in cross section.

As shown in the partial enlarged view in the portion A, side walls 13 of the engaging groove 11 extend toward the front side and cover at least a portion of the engaging groove 11 on the front side. Specifically, the second light source holding member 1b has a through hole substantially in the shape of a circle in cross section and extending the entire length of the second light source holding member 1b in the longer direction, and a slit opening on the front side which extends the entire length of the light source holding member 1b in the longer direction. In other words, the second light source holding member 1b is substantially in the shape of a letter C in cross section which opens on the front side. The radius of curvature of the inner surface of the engaging groove 11 and the side walls 13 is preferably set to be substantially equal to the radius of curvature of the outer surface of the tube body 531 of the light source 53.

The side walls 13 are elastically deformable, and the space between the opposed ends of the side walls 13 can be widened. By widening the space between the opposed ends of the side walls 13, the tube body 531 of the light source 53 can be inserted through the space to be housed in the region defined by the inner surface of the engaging groove 11 and the side walls 13. The side walls 13 prevent the tube body 531 of the light source 53 being housed in the region surrounded by the engaging groove 11 and the side walls 13 from coming off the region.

Because the radius of curvature of the inner surface of the engaging groove 11 and the side walls 13 is preferably substantially equal to the radius of curvature of the outer surface of the tube body 531 of the light source 53, the tube body 531 of the light source 53 being housed in the region is preferably brought into surface contact with the inner surface of the engaging groove 11 and the side walls 13. Thus, heat of the tube body 531 of the light source 53 is transferred to the second light source holding member 1b through the inner surface of the engaging groove 11 and the side walls 13.

The height of the side walls 13 is preferably set in accordance with use conditions of the light source 53. If the height of the side walls 13 is increased, the contact area between the outer surface of the tube body 531 of the light source 53 and the second light source holding member 1b is increased. If the height of the side walls 13 is decreased, the contact area is decreased. As described above, when the height of the side walls 13 changes, the contact area between the outer surface of the tube body 531 of the light source 53 and the second light source holding member 1b changes according to the change of the height of the side walls 13, and accordingly, the amount of heat which is transferred from the tube body 531 of the light source 53 to the second light source holding member 1b also changes. Because the amount of light emitted by the light source 53 changes according to the temperature of the tube body 531 and the temperature of the tube body 531 is influenced by the amount of heat which is transferred from the tube body 531 to the second light source holding member 1b, the state of light emitted by the light source 53 can be adjusted by setting the height of the side walls 13 as appropriate. Thus, the height of the side walls 13 is preferably set as appropriate in accordance with use conditions of the light source 53 in order that the light source 53 can emit light in the most appropriate state during the use of the light source unit (i.e., the most appropriate temperature of the tube body 531 can be maintained).

The configuration of the constituent elements not described above may be the same as the configuration of the corresponding constituent elements of the first light source holding member 1a. For example, the length of the second light source holding member 1b may preferably be set to be substantially equal to the length of the tube body 531. In addition, material of the second light source holding member 1b may be a resin material such as ABS resin and polypropylene, and the second light source holding member 1b is preferably substantially transparent or substantially white, for example.

As shown in the cross sectional enlarged view in the direction of the arrow B, the first locking portions 12 capable of locking the bottom plate 511 of the chassis 51 are provided in given positions on the back side of the second light source holding member 1b. The configuration of the first locking portions 12 of the second light source holding member 1b may be the same as the configuration of the first locking portions 12 of the first light source holding members 1a.

The method of using the second light source holding member 1b having the configuration as described above is substantially the same as the method of using the first light source holding member 1a. In addition, the light source holding structure using the second light source holding member 1b can exert the same action and effect as the light source holding structure using the first light source holding member 1a.

Figure 5:
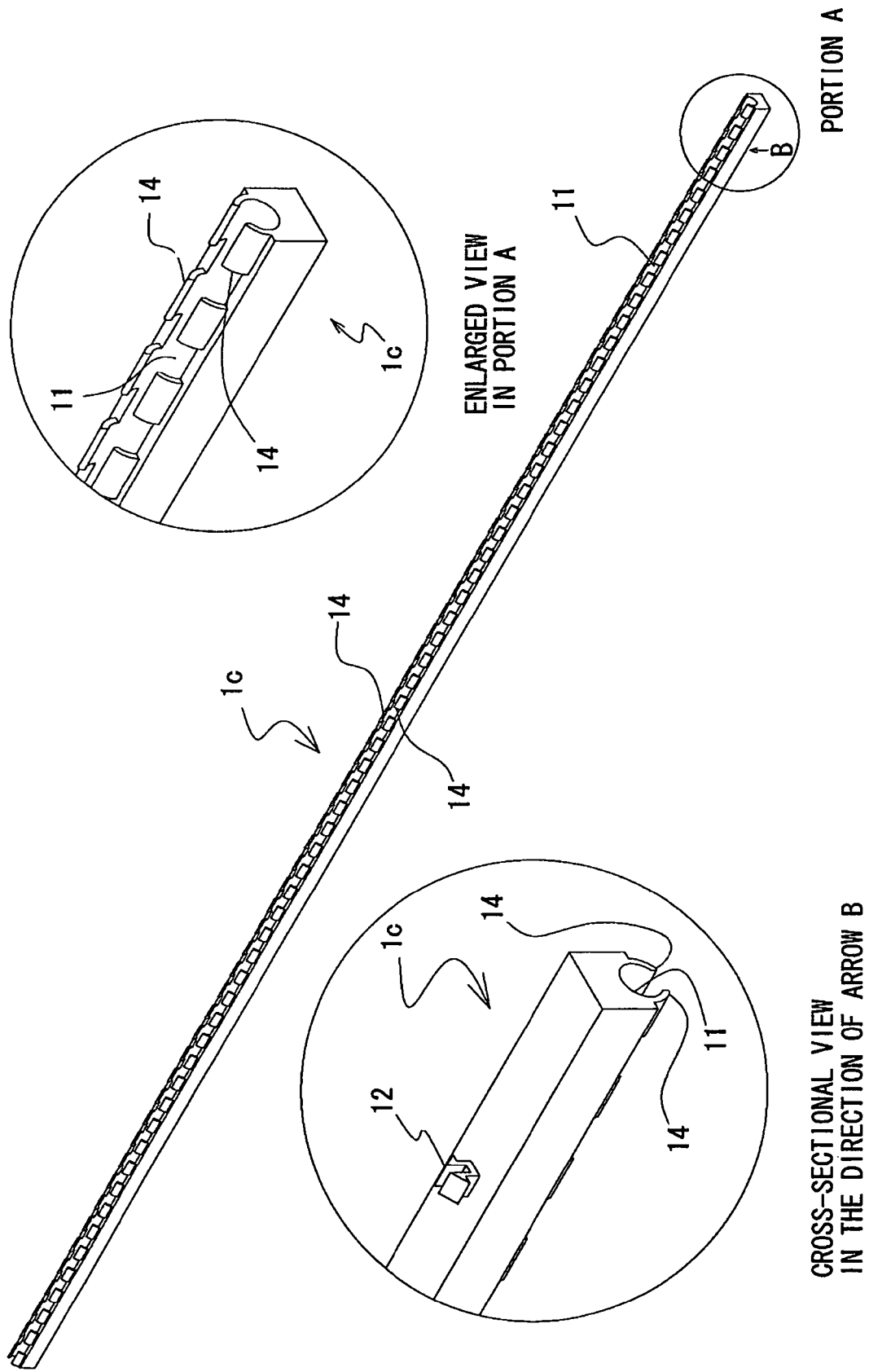
FIG. 5 is an external perspective view schematically showing the overall configuration of a third light source holding member which can be used in the light source holding structure according to a preferred embodiment of the present invention, including a partial enlarged view of the third light source holding member in the portion A and a cross-sectional enlarged view in the direction of the arrow B showing the configuration of the first locking portion on the back side of the third light source holding member.

Next, a description of a third light source holding member 1c is given. FIG. 5 is an external perspective view showing the overall configuration of the third light source holding member 1c, including a partial enlarged view of the third light source holding member 1c in the portion A and a cross-sectional enlarged view in the direction of the arrow B showing the first locking portion 12 on the back side of the third light source holding member 1c. In FIG. 5, the front side of the third light source holding member 1c faces toward the top of FIG. 5, and the back side thereof faces toward the bottom of FIG. 5.

As shown in FIG. 5, the third light source holding member 1c is substantially in the shape of a bar. On the front side, the third light source holding member 1c has the engaging groove 11 extending substantially the entire length of the third light source holding member 1c and capable of engaging with the tube body 531. The engaging groove 11 is substantially in the shape of a semicircle in cross section.

On each side of the engaging groove 11, side walls 14 of a given length and a given height are continuously arranged with a given pitch along the entire length of the third light source holding member 1c.

As shown in the partial enlarged view of the portion A, the side walls 14 of the third light source holding member 1 may have the same cross-sectional shape as the side walls 13 of the second light source holding member 1b. The side walls 14 are elastically deformable, and the spaces between the opposed ends of the side walls 14 can be widened. By widening the spaces between the opposed ends of the side walls 14, the tube body 531 can be inserted through the spaces to be housed in the region surrounded by the engaging groove 11 and the side walls 14. The side walls 14 prevent the tube body 531 being housed in the region surrounded by the engaging groove 11 and the side walls 14 from coming off the region.

Because the radius of curvature of the inner surface of the engaging groove 11 and the side walls 14 is preferably substantially equal to the radius of curvature of the outer surface of the tube body 531, the tube body 531 being housed in the region is brought into surface contact with the inner surface of the engaging groove 11 and the side walls 14. Heat of the tube body 531 is transferred to the third light source holding member 1c through the inner surface of the engaging groove 11 and the side walls 14.

The length, height, and pitch of the side walls 14 are preferably set in accordance with use conditions of the light source 53. By changing the length, height, and pitch of the side walls 14, the contact area between the outer surface of the tube body 531 and the third light source holding member 1c can be increased or decreased. The amount of light emitted by the light source 53 is influenced by the temperature of the tube body 531, and the temperature of the tube body 531 is influenced by the contact area between the outer surface of the tube body 531 and the third light source holding member 1c. Therefore, the length, height, and pitch of the side walls 14 are preferably set as appropriate in accordance with use conditions of the light source 53 so that the light source 53 can emit light in the most appropriate state during the use of the light source unit (i.e., the most appropriate temperature of the tube body 531 can be maintained).

The configuration of the constituent elements not described above may be the same as the configuration of the corresponding constituent elements of the first light source holding member 1a or the second light source holding member 1b. As shown in the cross sectional enlarged view in the direction of the arrow B, the first locking portions 12 are provided in given positions on the back side of the third light source holding member 1c, and descriptions thereof are omitted. The method of using the third light source holding member 1c having the configuration as described above is substantially the same as the method of using the first light source holding member 1a or the second light source holding member 1b. In addition, the light source holding structure using the third light source holding member 1c can exert the same action and effect as the light source holding structure using the first light source holding member 1a or the second light source holding member 1b.

Figure 6:
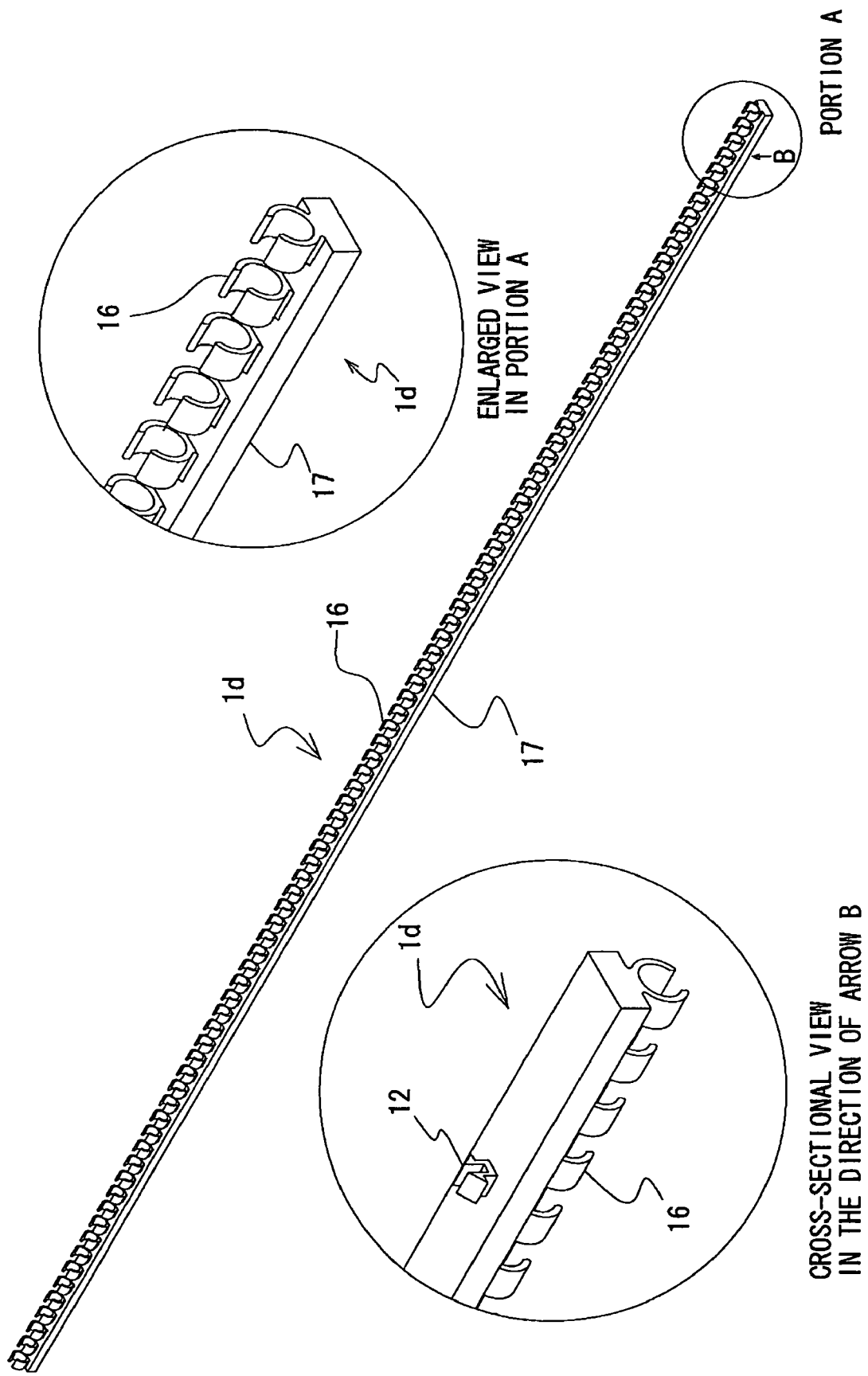
FIG. 6 is an external perspective view schematically showing the overall configuration of a fourth light source holding member which can be used in the light source holding structure according to a preferred embodiment of the present invention, including a partial enlarged view of the fourth light source holding member in the portion A and a cross-sectional enlarged view in the direction of the arrow B showing the configuration of the first locking portion on the back side of the fourth light source holding member.

Next, a description of a fourth light source holding member 1d is given. FIG. 6 is an external perspective view schematically showing the overall configuration of the fourth light source holding member 1d, including a partial enlarged view of the fourth light source holding member 1d in the portion A and a cross-sectional enlarged view in the direction of the arrow B showing the first locking portion 12 on the back side of the fourth light source holding member 1d. In FIG. 6, the front side of the fourth light source holding member 1d faces toward the top of FIG. 6, and the back side thereof faces toward the bottom of FIG. 6.

As shown in FIG. 6, the fourth light source holding member 1d has a base 17 substantially in the shape of a bar, a plurality of third locking portions 16 on the front side of the base 17, and the first locking portions 12 on the back side of the base 17. The plurality of third locking portions 16 are continuously arranged with a given pitch along the entire length of the base 17. The fourth light source holding member 1d including the base 17 and the third locking portions 16 is a unitary molded member which is preferably made of a resin material such as ABS resin and polypropylene.

As shown in FIG. 6 (especially in the partial enlarged view in the portion A), the third locking portions 16 on the front side of the base 17 are substantially in the shape of a circle in cross section and have slit openings on the front side. In other words, the third locking portions 16 are substantially in the shape of a letter C in cross section which opens on the front side. In addition, the radius of curvature of the inner surface of the third locking portions 16 is preferably substantially equal to or less than the radius of curvature of the outer surface of the tube body 531 of the light source 53. The third locking portions 16 are elastically deformable. By widening the openings of the third locking portions 16, the tube body 531 of the light source 53 can be inserted through the openings to be housed in the region surrounded by the third locking portions 16. The tube body 531 being housed in the region surrounded by the third locking portions 16 is held by the third locking portions 16 and does not come off the region spontaneously (e.g., by self weight of the light source 53).

Because the radius of curvature of the inner surface of the third locking portions 16 is preferably substantially equal to or less than the radius of curvature of the outer surface of the tube body 531, the tube body 531 being held by the third locking portions 16 is brought into surface contact with the inner surface of the third locking portions 16. Heat of the tube body 531 can be transferred to the fourth light source holding member 1d through the inner surface of the third locking portions 16.

The length and pitch of the third locking portions 16 of the base 17 in the longer direction are preferably set in accordance with use conditions of the light source 53. By changing the length and pitch of the third locking portions 16, the contact area between the outer surface of the tube body 531 and the fourth light source holding member 1d can be increased or decreased. The amount of light emitted by the light source 53 is influenced by the temperature of the tube body 531, and the temperature of the tube body 531 is influenced by the contact area between the outer surface of the tube body and the fourth light source holding member 1d. Therefore, the length and pitch of the third locking portions 16 are preferably set as appropriate in accordance with use conditions of the light source 53 in order that the light source 53 can emit light in the most appropriate state during the use of the light source unit (i.e., the most appropriate temperature of the tube body 531 can be maintained).

The length of the base 17 in the longer direction is preferably substantially equal to the length of the tube body 531. Substantially the entire length of the tube body is brought into contact with the third locking portions 16.

As shown in the cross sectional enlarged view in the direction of the arrow B, these first locking portions 12 are provided in given positions on the back side of the base 17. The configuration of the first locking portions 12 may be the same as the configuration of the first locking portions 12 on the back side of the first light source holding member 1a.

The method of using the fourth light source holding member 1d is substantially the same as the method of using the first, second, or third light source holding member 1a, 1b, or 1c. In addition, the light source holding structure using the fourth light source holding member 1d can exert the same action and effect as the light source holding structure using the first, second, or third light source holding member 1a, 1b, or 1c. Thus, a description thereof is omitted.

During the use of the light sources such as fluorescent tubes, heat is most generated by the electrodes. Therefore, the temperature of the tube body 531 of the light source 53 is high in the end portions of the tube body 531 and low in the central portion. Accordingly, the amount of light emitted by the light source 53 could be larger in the end portions of the tube body 531 and smaller in the center portion. Next, a description of a light source holding member by which the temperature gradient of the tube body 531 can be eliminated or decreased is given.

Figure 7:
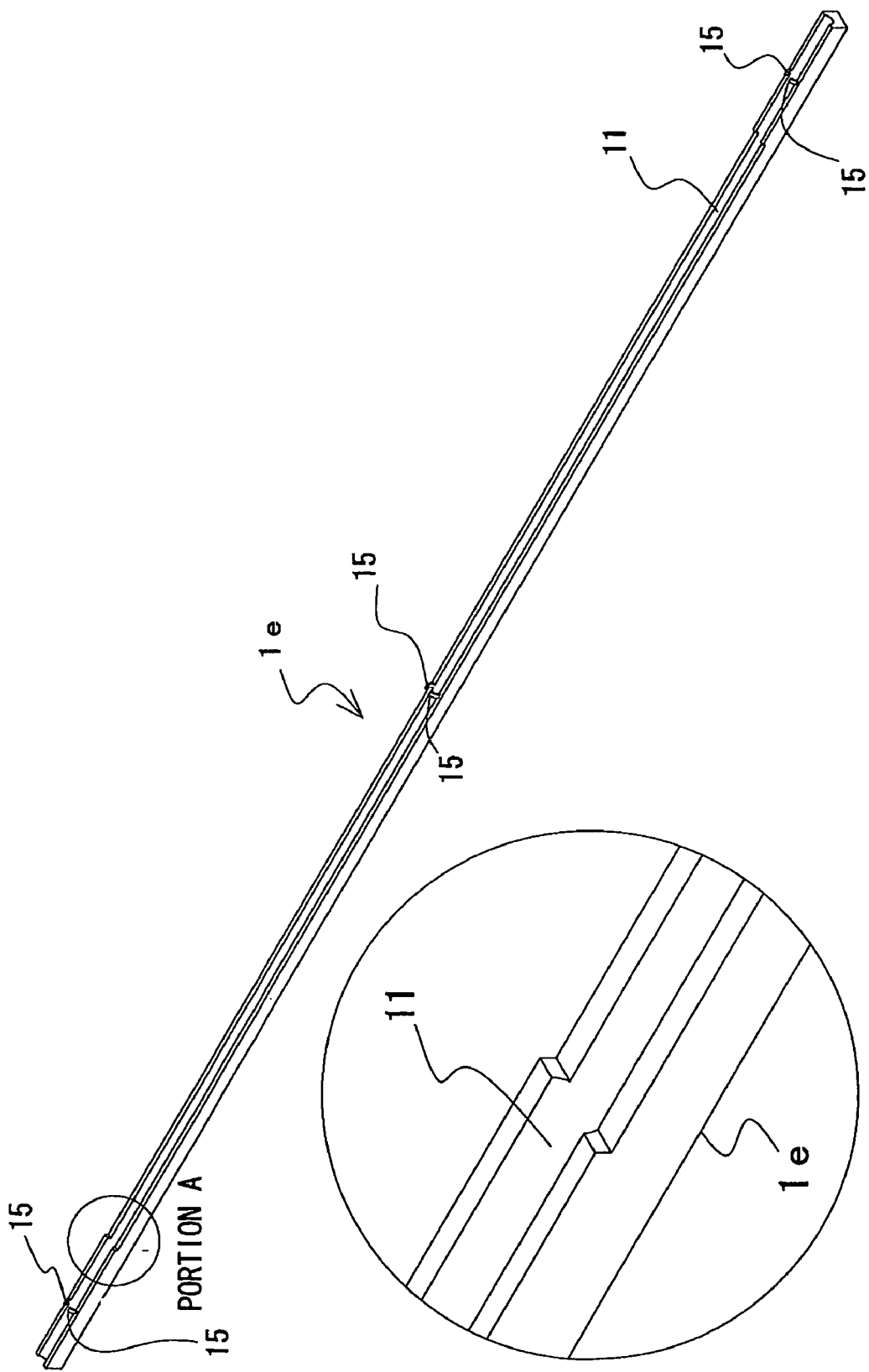
FIG. 7 is an external perspective view showing the overall configuration of a fifth light source holding member which can be used in the light source holding structure according to a preferred embodiment of the present invention, including a partial enlarged view of the fifth light source holding member in the portion A.

FIG. 7 is an external perspective view showing the overall configuration of a fifth light source holding member 1e, including a partial enlarged view of the fifth light source holding member 1e in the portion A. In FIG. 7, the front side of the fifth light source holding member 1e faces toward the top of FIG. 7, and the back side thereof faces toward the bottom of FIG. 7.

As shown in FIG. 7, the fifth light source holding member 1e is substantially in the shape of a bar. The fifth light source holding member 1e has on the front side the engaging groove 11 extending substantially the entire length of the fifth light source holding member 1e and capable of engaging with the tube body 531 of the light source 53. The engaging groove 11 is substantially in the shape of a semicircle in cross section. The radius of curvature of the inner surface of the engaging groove 11 is preferably substantially equal to the radius of curvature of the outer surface of the tube body 531.

The depth of the engaging groove 11 is preferably deeper in the end portions of the fifth light source holding member 1e in the longer direction and lower in the central portion. To be specific, as shown in FIG. 7 (especially in the partial enlarged view in the portion A), there are steps on the front side of the fifth light source holding member 1e, so that the height of the fifth light source holding member 1e (i.e., the length from the back side to the front side of the fifth light source holding member 1e) is higher in the end portions of the fifth light source holding member 1e in the longer direction and lower in the other portion. The other constituent elements may have the same configuration as the corresponding constituent elements of the first light source holding member 1a. Thus, descriptions thereof are omitted.

When the tube body 531 is engaged in the engaging groove 11 of the fifth light source holding member 1e having the configuration as described above, the end portions of the tube body 531 are located in the portions at which the depth of the engaging groove 11 is deeper, and therefore, the contact area per unit length between the fifth light source holding member 1e and the inner surface of the engaging groove 11 is larger. In addition, the central portion of the tube body 531 is located in the portion at which the depth of the engaging groove 11 is shallower, and therefore, the contact area per unit length is smaller. Accordingly, heat generated by the electrodes at the end portions of the tube body 531 is transferred to the fifth light source holding member 1e more through the end portions of the tube body 531 and less through the central portion. As a result, the difference between the temperatures of the end portions and the central portion of the tube body 531 can be decreased, and the temperature distribution of the tube body 531 can be made uniform.

As described above, not only the light source holding structure using the fifth light source holding member 1e can exert the same action and effect as the light source holding structure using the first light source holding member 1a, but also the difference between the amounts of light emitted through the end portions and the central portion of the tube body 531 can be decreased.

Figure 8:
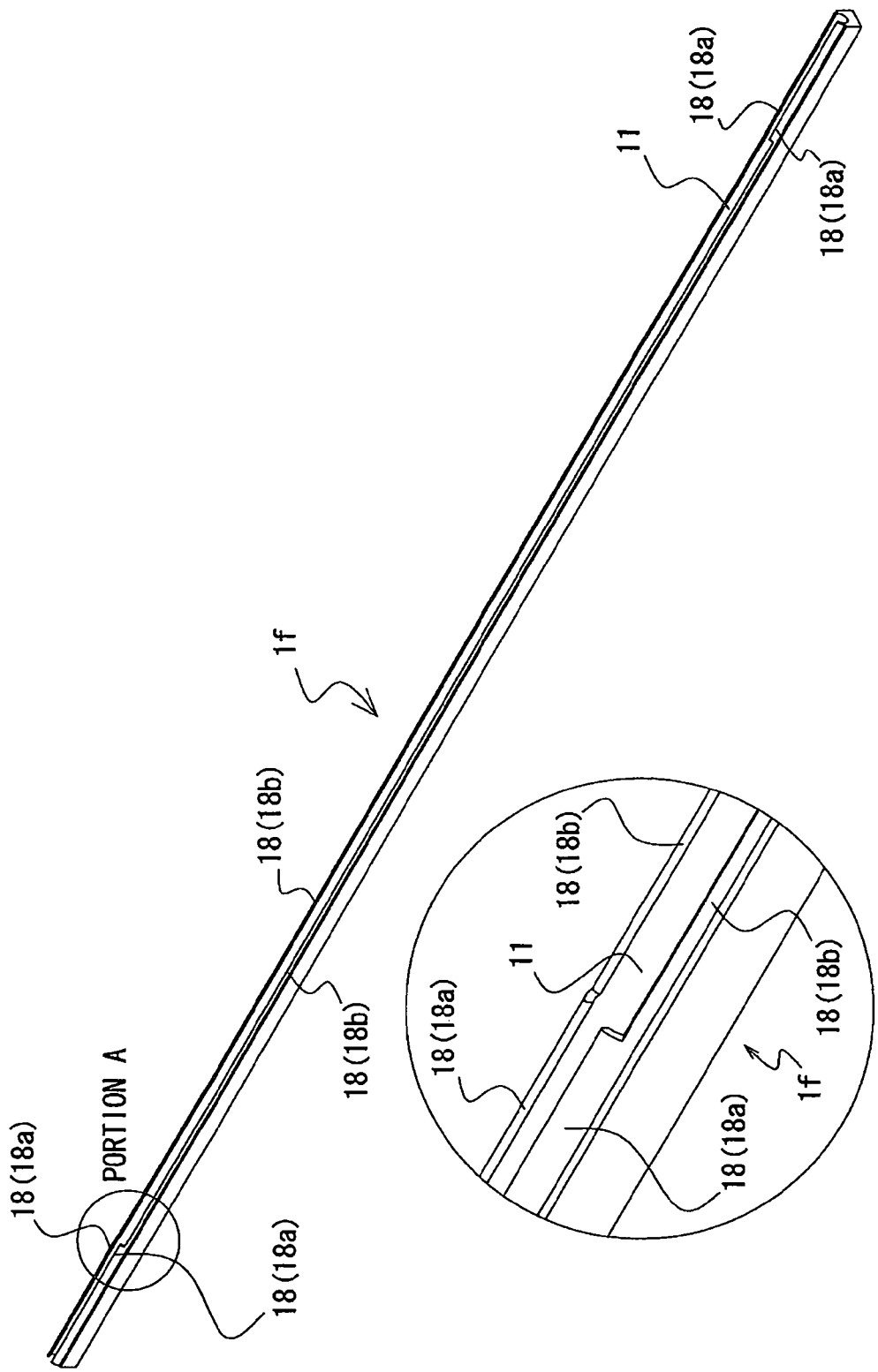
FIG. 8 is an external perspective view showing the overall configuration of a sixth light source holding member which can be used in the light source holding structure according to a preferred embodiment of the present invention, including a partial enlarged view of the sixth light source holding member in the portion A.

Next, a description of a sixth light source holding member if is given. FIG. 8 is an external perspective view showing the overall configuration of the sixth light source holding member 1f, including a partial enlarged view of the sixth light source holding member 1f in the portion A. In FIG. 8, the front side of the sixth light source holding member 1f faces toward the top of FIG. 8, and the back side thereof faces toward the bottom of FIG. 8.

As shown in FIG. 8, the sixth light source holding member 1f is substantially in the shape of a bar. The sixth light source holding member 1f has on the front side the engaging groove 11 extending substantially the entire length of the sixth light source holding member 1f and capable of engaging with the tube body 531 of the light source 53, and side walls 18 standing toward the front side on both sides of the engaging groove 11. The inner surface of the engaging groove 11 and the side walls 18 are substantially in the shape of a segment of a circle in cross section. The radius of curvature of the inner surface of the engaging groove 11 and the side walls 18 is preferably substantially equal to the radius of curvature of the outer surface of the tube body 531.

As shown in FIG. 8 (especially in the partial enlarged view in the portion A), each side wall 18 preferably includes higher portions 18a in the end portions of the sixth light source holding member 1f in the longer direction, and a lower portion 18b in the other portion. The other constituent elements may have the same configuration as the corresponding constituent elements of the second light source holding member 1b, and descriptions thereof are omitted.

When the tube body 531 is housed in the region defined by the inner surface of the engaging groove 11 and the side walls 18 of the sixth light source holding member 1f having the configuration as described above, the outer surface of the tube body 531 is brought into surface contact with the inner surface of the engaging groove 11 and the side walls 18. At the same time, the end portions of the tube body 531 are housed in the higher portions 18a of the side walls 18, and the other portion is housed in the lower portions 18b of the side walls 18.

Thus, the contact area per unit length between the outer surface in the end portions of the tube body 531 and the sixth light source holding member 1f is larger than the contact area between the outer surface in the other portion (i.e., the central portion) of the tube body 531 and the sixth light source holding member 1f. Accordingly, heat generated by the electrodes at the end portions of the tube body 531 is transferred to the sixth light source holding member 1f more through the end portions of the tube body 531 and less through the other portion, i.e., the central portion. As a result, the difference between the temperatures of the end portions and the central portion of the tube body 531 can be decreased, and the temperature distribution of the tube body 531 can be made uniform.

As described above, not only the light source holding structure using the sixth light source holding member 1f can exert the same action and effect as the light source holding structure using the second light source holding member 1b, but also the difference between the amounts of light emitted through the end portions and the central portion of the tube body 531 can be decreased.

Figure 9:
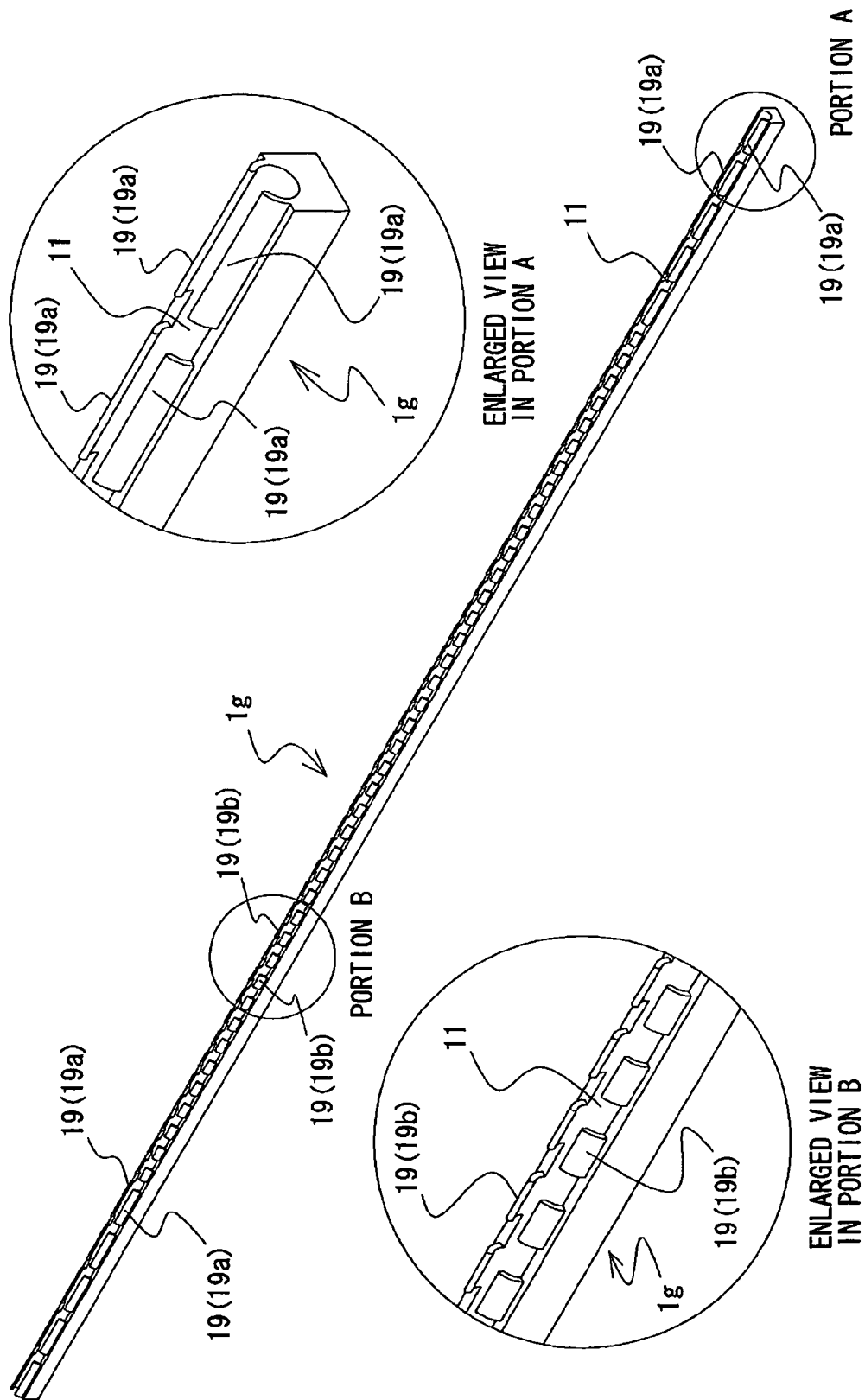
FIG. 9 is an external perspective view showing the overall configuration of a seventh light source holding member which can be used in the light source holding structure according to a preferred embodiment of the present invention, including partial enlarged views of the seventh light source holding member in the portions A and B.

Next, a description of a seventh light source holding member 1g is given. FIG. 9 is an external perspective view showing the overall configuration of the seventh light source holding member 1g, including partial enlarged views of the seventh light source holding member 1g in the portions A and B. In FIG. 9, the front side of the seventh light source holding member 1g faces toward the top of FIG. 9, and the back side thereof faces toward the bottom of FIG. 9.

As shown in FIG. 9, the seventh light source holding member 1g is substantially in the shape of a bar. The seventh light source holding member 1g has on the front side the engaging groove 11 extending substantially the entire length of the seventh light source holding member 1g and capable of engaging with the tube body 531 of the light source 53. The engaging groove 11 is substantially in the shape of a semicircle in cross section.

On each side of the engaging groove 11, the seventh light source holding member 1g has side walls 19 with given lengths and a given height. The side walls 19 are arranged with given pitches along the entire length of the seventh light source holding member 1g. The side walls 19 may have the same cross-sectional shape as the side walls 13 of the second light source holding member 1b. The side walls 19 are elastically deformable, and the spaces between the opposed ends of the side walls 19 can be widened. By widening the spaces between the opposed ends of the side walls 19, the tube body 531 of the light source 53 can be inserted through the spaces to be housed in the region surrounded by the engaging groove 11 and the side walls 19. The side walls 19 prevent the tube body 531 being housed in the region surrounded by the engaging groove 11 and the side walls 19 from coming off the region.

As shown in FIG. 9, the side walls 19 on each side of the engaging groove 11 preferably include longer side walls 19a in the end portions of the seventh light source holding member 1g in the longer direction (see the partial enlarged view in the portion A), and shorter side walls 19b in the other portion (see the partial enlarged view in the portion B). Except for the lengths of the side walls 19, the same configuration as the third light source holding member 1c can be used.

When the tube body 531 is housed in the region defined by the inner surface of the engaging groove 11 and the side walls 19 of the seventh light source holding member 1g, the outer surface of the tube body 531 is brought into surface contact with the inner surface of the engaging groove 11 and the side walls 19. The end portions of the tube body 531 are brought into contact with the longer side walls 19a, and the other portion (i.e., the central portion) is brought into contact with the shorter side walls 19b.

Therefore, the contact area between the outer surface in the end portions of the tube body 531 and the seventh light source holding member 1g is larger than the contact area between the outer surface in the other portion, i.e., the central portion of the tube body 531 and the seventh light source holding member 1g. Thus, heat generated by the electrodes at the end portions of the tube body 531 is transferred to the seventh light source holding member 1g more through the end portions of the tube body 531 and less through the central portion. As a result, the difference between the temperatures of the end portions and the central portion of the tube body 531 can be decreased, and the temperature distribution of the tube body 531 can be made uniform.

As described above, not only the light source holding structure using the seventh light source holding member 1g can exert the same action and effect as the light source holding structure using the third light source holding member 1c, but also the difference between the amounts of light emitted through the end portions and the central portion of the tube body 531 can be decreased.

Figure 10:
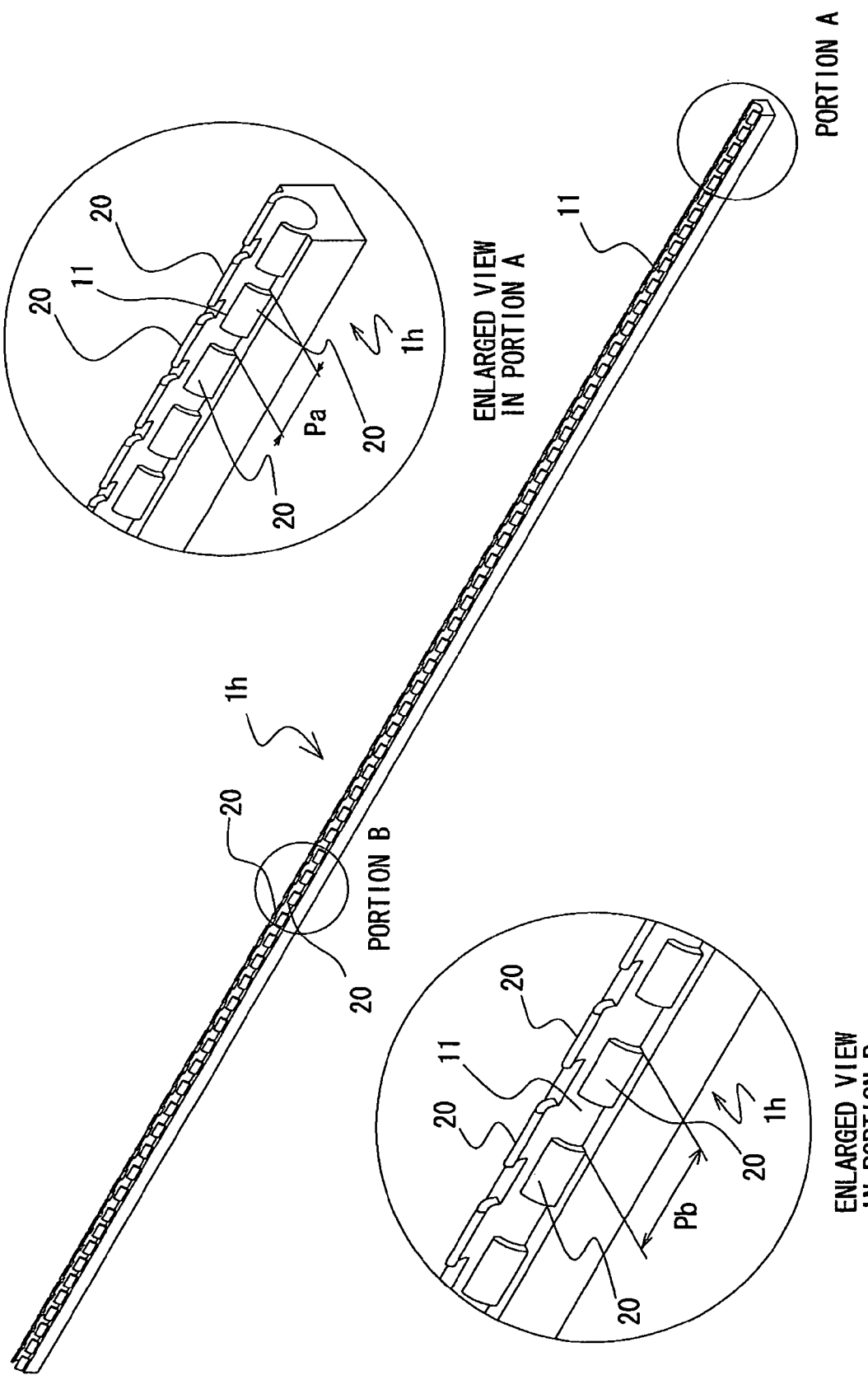
FIG. 10 is an external perspective view showing the overall configuration of an eighth light source holding member which can be used in the light source holding structure according to a preferred embodiment of the present invention, including partial enlarged views of the eighth light source holding member in the portions A and B.

Next, a description of an eighth light source holding member 1h is given. FIG. 10 is an external perspective view showing the overall configuration of the eighth light source holding member 1h, including partial enlarged views of the eighth light source holding member 1h in the portions A and B. In FIG. 10, the frontside of the eighth light source holding member 1h faces toward the top of FIG. 10, and the back side thereof faces toward the bottom of FIG. 10.

As shown in FIG. 10, the eighth light source holding member 1h is substantially in the shape of a bar. On the front side, the eighth light source holding member 1h has the engaging groove 11 extending substantially the entire length of the eighth light source holding member 1h and capable of engaging with the tube body 531 of the light source 53. On each side of the engaging groove 11, the eighth light source holding member 1h has side walls 20 with a given length and a given height. The side walls 20 are continuously arranged with given pitches along the entire length of the eighth light source holding member 1h.

A pitch $P_a$ of the side walls 20 in the end portions of the eight light source holding member 1h in the longer direction is preferably smaller than a pitch $P_b$ of the side walls 20 in the other portion (i.e., the central portion) (see the partial enlarged views in the portions A and B of FIG. 10). The constituent elements other than the pitches of the side walls 20 may have the same configuration as the corresponding constituent elements of the third light source holding member 1c, and descriptions thereof are omitted.

When the tube body 531 of the light source 53 is housed in the region defined by the inner surface of the engaging groove 11 and the side walls 20 of the eighth light source holding member 1h, the contact area per unit length between the outer surface in the end portions of the tube body 531 and the eighth light source holding member 1h is larger than the contact area between the outer surface in the other portion (i.e., the central portion) of the tube body 531 and the eighth light source holding member 1h. Accordingly, heat generated by the electrodes at the end portions of the tube body 531 is transferred to the eighth light source holding member 1h more through the end portions of the tube body 531 and less through the central portion. As a result, the difference between the temperatures of the end portions and the central portion of the tube body 531 can be decreased, and the temperature distribution of the tube body 531 can be made uniform.

As described above, not only the light source holding structure using the eighth light source holding member 1h can exert the same action and effect as the light source holding structure using the third light source holding member 1c, but also the difference between the amounts of light emitted through the end portions and the central portion of the tube body 531 can be decreased.

Figure 11:
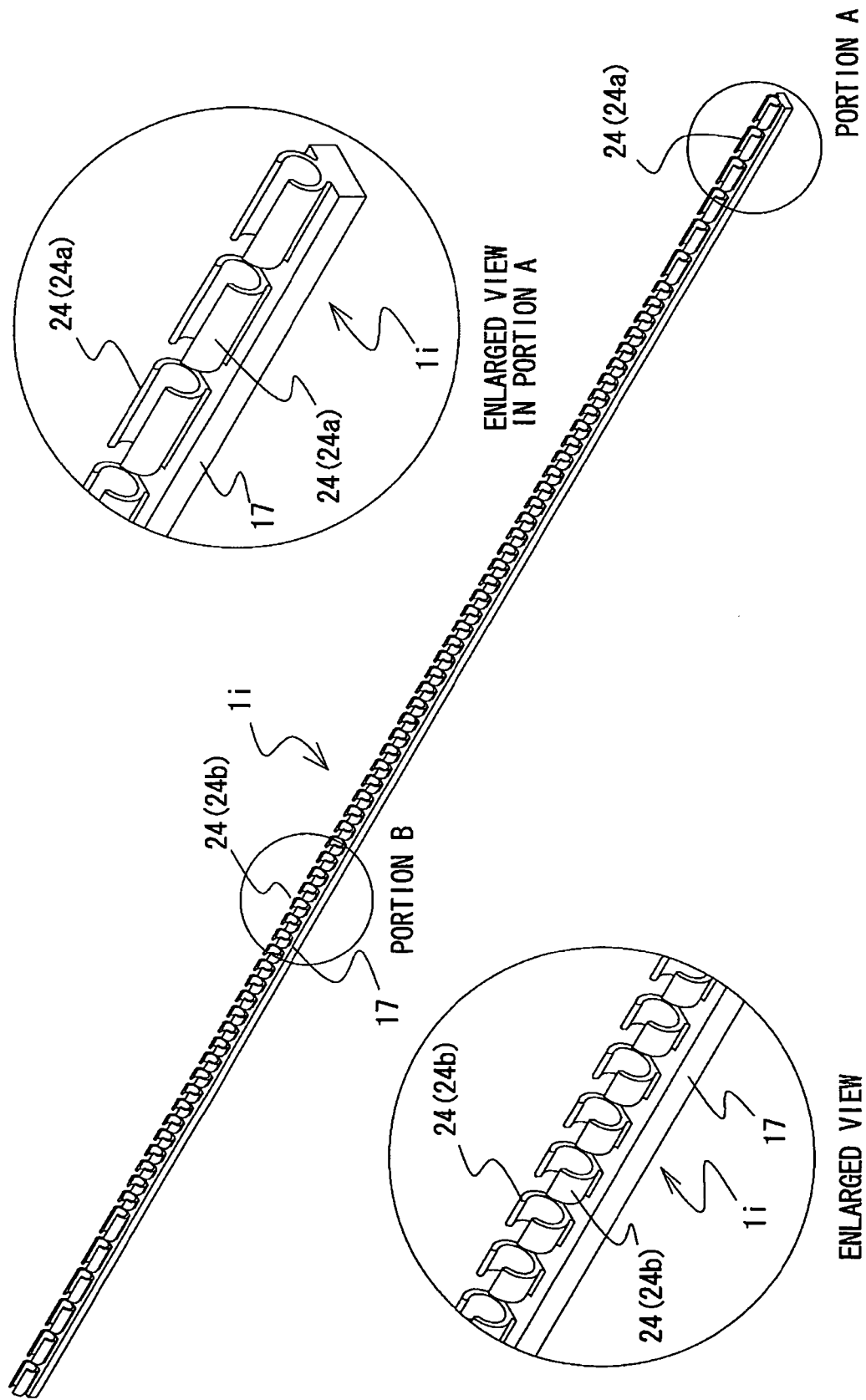
FIG. 11 is an external perspective view schematically showing the overall configuration of a ninth light source holding member which can be used in the light source holding structure according to a preferred embodiment of the present invention, including partial enlarged views of the ninth light source holding member in the portions A and B.

Next, a description of a ninth light source holding member 1i is given. FIG. 11 is an external perspective view schematically showing the overall configuration of the ninth light source holding member 1i, including partial enlarged views of the ninth light source holding member 1i in the portions A and B. In FIG. 11, the front side of the ninth light source holding member 1i faces toward the top of FIG. 11, and the back side thereof faces toward the bottom of FIG. 11.

As shown in FIG. 11, the ninth light source holding member 1i has the base 17 substantially in the shape of a bar, a plurality of fourth locking portions 24 on the front side of the base 17, and the first locking portions 12 on the back side of the base 17.

The fourth locking portions 24 on the front side of the base 17 have the same configuration as the third locking portions 16 on the front side of the base 17 of the fourth light source holding member 1d except for the difference in their lengths in the longer direction of the base 17. The fourth locking portions 24 preferably include longer fourth locking portions 24a in the end portions of the base 17 in the longer direction and shorter fourth locking portions 24b in the other portion (i.e., the central portion). The other constituent elements have the same configuration as the corresponding constituent elements of the fourth light source holding member 1d, and descriptions thereof are omitted.

When the tube body 531 of the light source 53 is held by the fourth locking portions 24 of the ninth light source holding member 1i, the contact area between the outer surface in the end portions of the tube body 531 and the ninth light source holding member 1i is larger than the contact area between the outer surface in the other portion of the tube body 531 and the ninth light source holding member 1i. Accordingly, heat generated by the electrodes at the end portions of the tube body 531 is transferred to the ninth light source holding member 1i more through the end portions of the tube body 531 and less through the other portion. As a result, the difference between the temperatures of the end portions and the central portion of the tube body 531 can be decreased, and the temperature distribution of the tube body 531 can be made uniform.

As described above, not only the light source holding structure using the ninth light source holding member 1i can exert the same action and effect as the light source holding structure using the fourth light source holding member 1d, but also the difference between the amounts of light emitted through the end portions and the central portion of the tube body 531 can be decreased.

Figure 12:
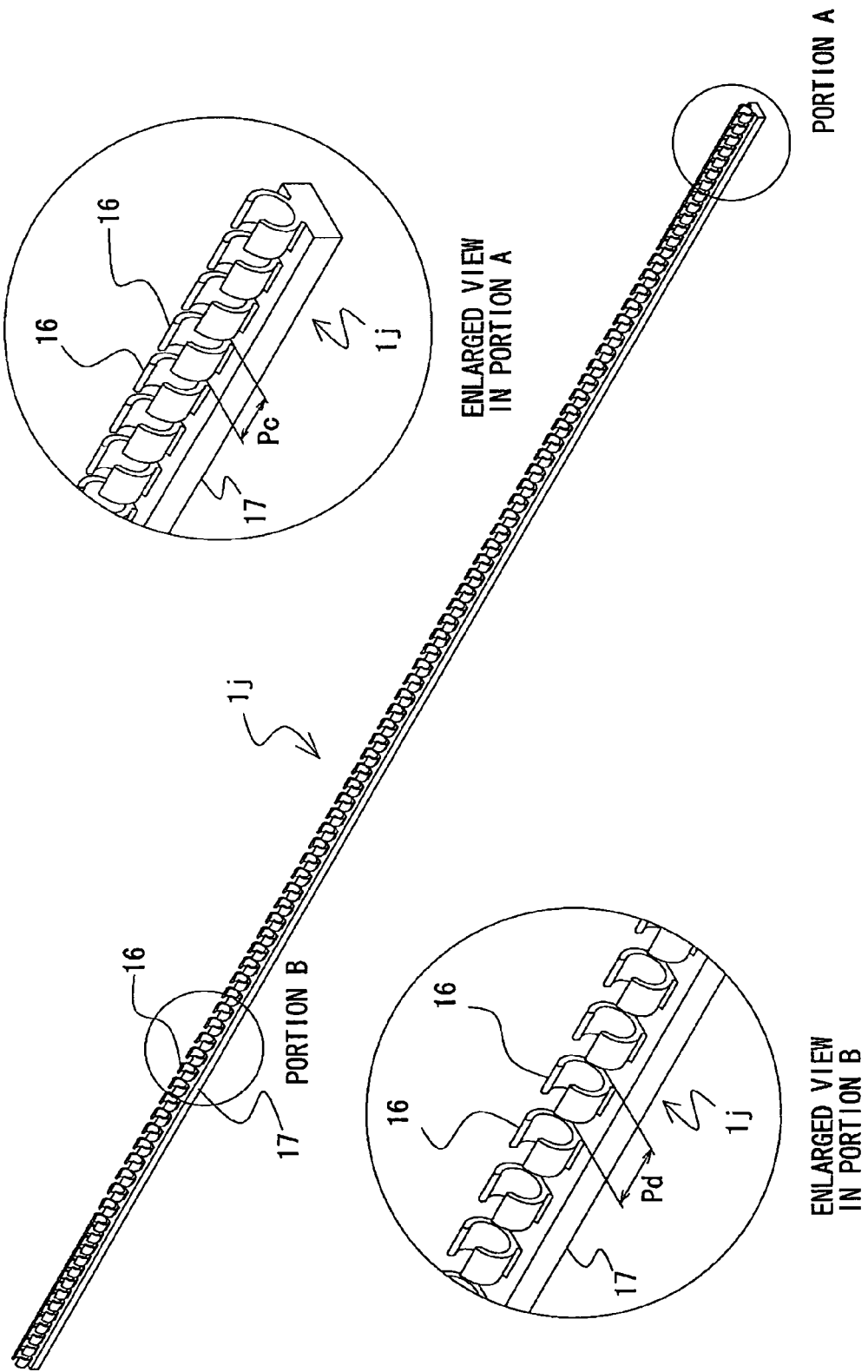
FIG. 12 is an external perspective view schematically showing the overall configuration of a tenth light source holding member which can be used in the light source holding structure according to a preferred embodiment of the present invention, including partial enlarged views of the tenth light source holding member in the portions A and B.

Next, a description of a tenth light source holding member 1j is given. FIG. 12 is an external perspective view schematically showing the overall configuration of the tenth light source holding member 1j, including partial enlarged views of the tenth light source holding member 1j in the portions A and B. In FIG. 12, the front side of the tenth light source holding member 1j faces toward the top of FIG. 12, and the back side thereof faces toward the bottom of FIG. 12.

As shown in FIG. 12, the tenth light source holding member 1j has the base 17 substantially in the shape of a bar, the plurality of third locking portions 16 on the front side of the base 17, and the first locking portions 12 on the back side of the base 17.

The third locking portions 16 on the front side of the base 17 may have the same configuration as the third locking portions 16 on the front side of the base 17 of the fourth light source holding member 1d. A pitch $P_c$ of the third locking portions 16 in the end portions of the base 17 in the longer direction are preferably be smaller than a pitch $P_d$ of the third locking portions 16 in the other portion (i.e., the central portion). The other constituent elements may have the same configuration as the corresponding constituent elements of the fourth light source holding member 1d, and descriptions thereof are omitted.

When the tube body 531 of the light source 53 is held by the third locking portions 16 of the tenth light source holding member 1j, the contact area between the outer surface in the end portions of the tube body 531 and the tenth light source holding member 1j is larger than the contact area between the outer surface in the central portion of the tube body 531 and the tenth light source holding member 1j. Accordingly, heat generated by the electrodes at the end portions of the tube body 531 is transferred to the tenth light source holding member 1j more through the end portions of the tube body 531 and less through the other portion. As a result, the difference between the temperatures of the end portions and the central portion of the tube body 531 can be decreased, and the temperature distribution of the tube body 531 can be made uniform.

As described above, not only the light source holding structure using the tenth light source holding member 1j can exert the same action and effect as the light source holding structure using the fourth light source holding member 1d, but also the difference between the amounts of light emitted through the end portions and the central portion of the tube body 531 can be decreased.

Figure 13:
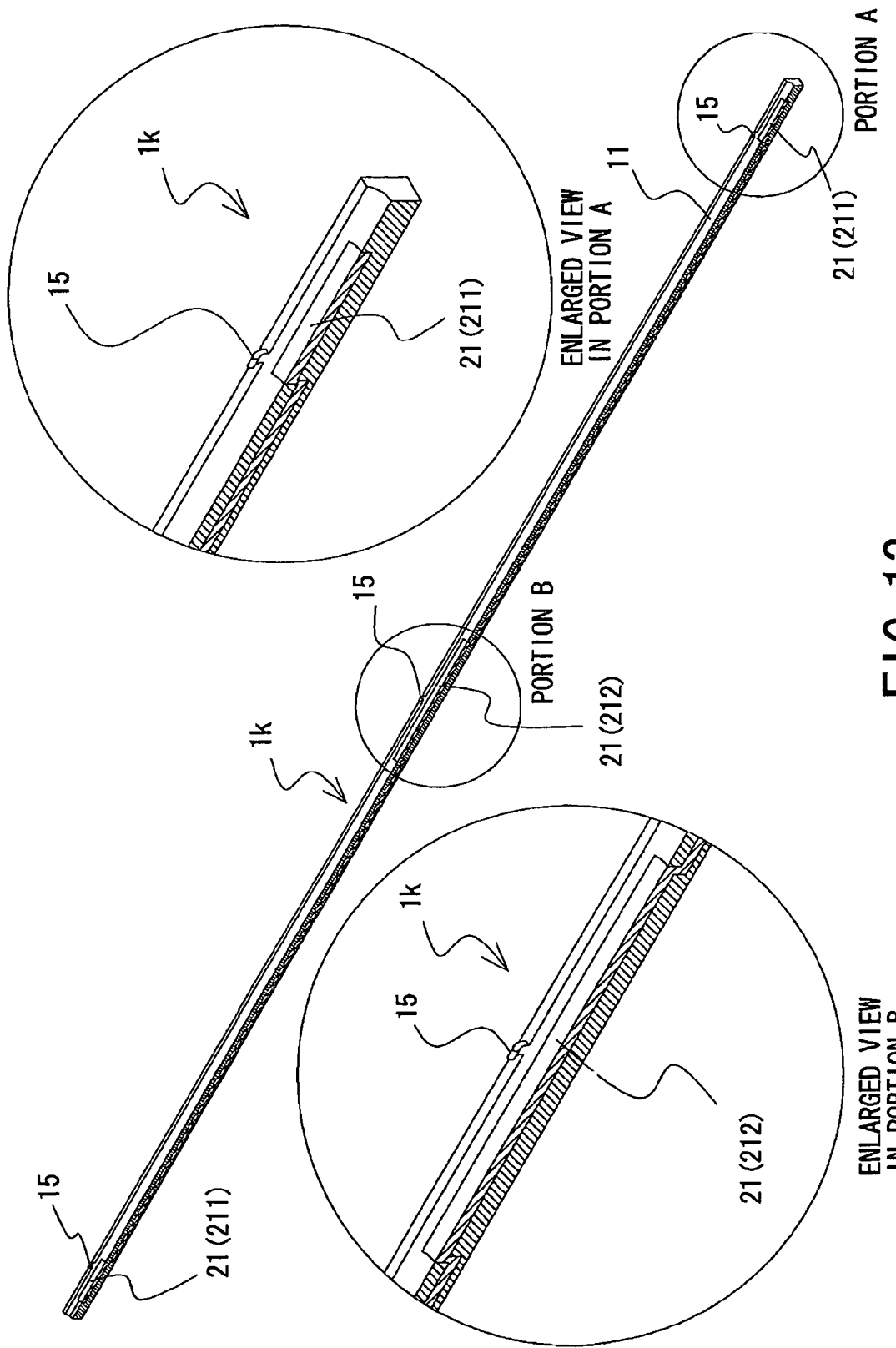
FIG. 13 is a schematic perspective view showing the inner configuration of an eleventh light source holding member which can be used in the light source holding structure according to a preferred embodiment of the present invention, including sectional views of the eleventh light source holding member in the portions A and B.

Next, a description of an eleventh light source holding member 1k is given. FIG. 13 is a schematic perspective view schematically showing the inner configuration of the eleventh light source holding member 1k, including sectional views of the eleventh light source holding member 1k in the portions A and B. The eleventh light source holding member 1k has a heat conduction member 21 inside. The other constituent elements may have the same configuration as the corresponding constituent elements of any one of the first to tenth light source holding members 1a to 1j. The eleventh light source holding member 1k in FIG. 13 has the same configuration as the first light source holding member 1a, based on which descriptions will be given. Descriptions of the constituent elements having the same configuration as the corresponding constituent elements of any one of the first to tenth light source holding members 1a to 1j are omitted.

The heat conduction member 21 has higher heat conductivity than the main body of the eleventh light source holding member 1k and is preferably made of a metallic material such as aluminum, for example. The heat conduction member 21 is substantially in the shape of a bar which is bent at given positions. The heat conduction member 21 has portions 211 and a portion 212. When the light source 53 is held by the eleventh light source holding member 1k, the portions 211 are located in positions which are deviated to the center side from positions corresponding to the electrodes in the end portions of the tube body 531 of the light source 53, and are exposed on or adjacent to the inner surface of the engaging groove 11. The portion 212 is located in a position corresponding to the center portion of the tube body 531 and is exposed on or adjacent to the inner surface of the engaging groove 11. In FIG. 13, the portions 211 and 212 are exposed on the inner surface of the engaging groove 11.

Owing to this configuration, heat generated by the electrodes during the lighting of the light source 53 is transferred to the central portion of the tube body 531 through the heat conduction member 21. Accordingly, the difference between the temperatures of the end portions and the central portion of the tube body 531 can be decreased, and the difference between the amounts of light emitted through the end portions and the center portion of the tube body 531 can be eliminated or decreased.

The reason why the portions 211 which are exposed on or adjacent to the inner surface of the engaging groove 11 of the heat conduction member 21 are located in the positions which are deviated to the center side from the positions corresponding to the electrodes of the light source 53 is given below.

During the lighting of the light source 53, electrons successively collide against the electrodes. By the sputtering effect which is produced when electrons collide against the electrodes, mercury in peripheral portions of the electrodes and substances making up the electrodes react with each other to form a mercury compound. Therefore, continuing the lighting of the light source 53 reduces mercury sealed in the tube body 531 and decreases the amount of light emitted by the light source 53, which brings the light source 53 to the end of its lifetime. In order not to shorten the lifetime of the light source 53, it is preferable to prevent mercury from gathering at the peripheral portions of the electrodes.

It is known that mercury gathers at a low temperature portion. Specifically, when the temperature of the tube body 531 is locally lowered, the vapor pressure of mercury is lowered in the low temperature portion. Accordingly, a force to make the vapor pressure of mercury uniform is exerted in the tube body 531, and mercury moves to the low temperature portion. Thus, when the temperatures in the peripheral portions of the electrodes become lower than the temperature in the other portion, mercury gathers at the peripheral portions of the electrodes.

Harnesses are connected to the electrodes, and rubber holders are attached to the tube body 531 in the peripheral portions of the electrodes. Thus, heat of the electrodes and the peripheral portions thereof in the tube body 531 is transferred to the outside through the harnesses connected to the electrodes and the rubber holders. Therefore, when the lighting of the light source 53 is stopped, the temperatures of the tube body 531 in the peripheral portions of the electrodes are rapidly lowered, and therefore, mercury tends to gather at the peripheral portions of the electrodes.

As described above, heat of the tube body 531 of the light source 53 is transferred to the outside also through the heat conduction member 21. Thus, when the lighting of the light source 53 is stopped, the temperatures are apt to be lowered in the portions where the heat conduction member 21 is exposed on or adjacent to the inner surface of the engaging groove 11 and in the vicinity of those portions. In addition, the portions 211 are exposed on or adjacent to the inner surface of the engaging groove 11 and are located in the positions which are deviated to the center side from the positions corresponding to the electrodes in the end portions of the tube body 531. Thus, mercury sealed in the tube body 531 is apt to gather in those portions when the lighting of the light source 53 is stopped. Therefore, it is possible to prevent or minimize gathering of mercury in the peripheral portions of the electrodes.

While the length of the light source holding member which can be used in the light source holding structure according to a preferred embodiment of the present invention may preferably be substantially equal to the length of the tube body 531 of the light source 53 in the above descriptions, the present invention is not limited thereto. A light source holding member that has a length that is shorter than the length of the tube body 531 of the light source 53 may be used.

Figure 14:
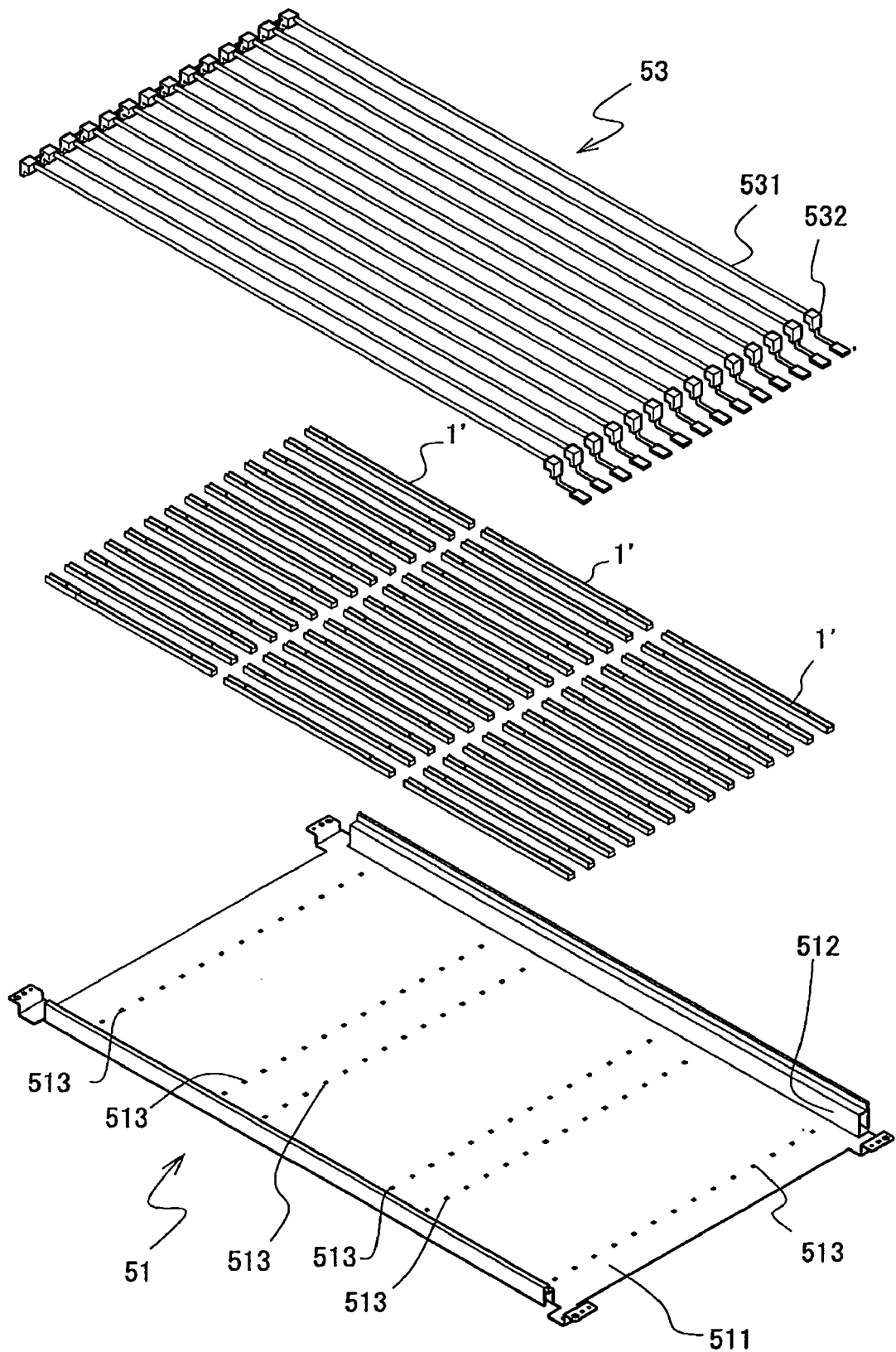
FIG. 14 is an exploded perspective view schematically showing the light source holding structure in which light source holding members the length of which is shorter than the length of the tube body of the light source are used, showing only the chassis, the light sources, and the light source holding members in the light source unit using the light source holding structure.

FIG. 14 is a schematic view of the light source holding structure in which a plurality of light source holding members 1', the length of each of which is shorter than the length of the tube body 531 of the light source 53 are used. To be specific, FIG. 14 is an exploded perspective view showing only the chassis 511, the light sources 53, and the light source holding members 1' in the light source unit using the light source holding structure.

As shown in FIG. 14, the plurality of light source holding members 1' are arranged in series and the tube body 531 of one light source 53 is held by the plurality of light source holding members 1' arranged in series. In FIG. 14, preferably three light source holding members 1' are arranged in series, and the tube body 531 of one light source 53 is held by the three light source holding members 1', for example. The length of each of the light source holding members 1' and the number of light source holding members 1' used for holding the tube body 531 of one light source 53 are not limited. The tube body 531 of one light source 53 may be held by two light source holding members 1' or may be held by four or more light source holding members 1', for example.

Except for the length of each of the light source holding members 1' in the longer direction, the configuration and size of the light source holding members 1' may be the same as the configuration and size of the light source holding member of any one of the first to tenth light source holding members 1a to 1k. Thus, descriptions thereof are omitted. The light source holding members 1' in FIG. 14 has substantially the same configuration as the first light source holding member 1a.

As described above, the configuration in which the plurality of light source holding members 1' the length of each of which is shorter than the length of the tube body 531 of the light source 53 are used to hold substantially the entire length of the tube body 531 of one light source 53 also can exert substantially the same action and effect as the configuration in which the light source holding member the length of which is substantially equal to the length of the tube body 531 of the light source 53 is used. In addition, the use of the light source holding members 1' the length of each of which is shorter than the length of the tube body 531 of the light source 53 allows for common use of the light source holding members 1' in light source units using light sources of various lengths. Because the length of each of the light source holding members 1' may be short, it is possible to prevent using a large molding die in making the light source holding members 1' by resin molding.

Figure 15:
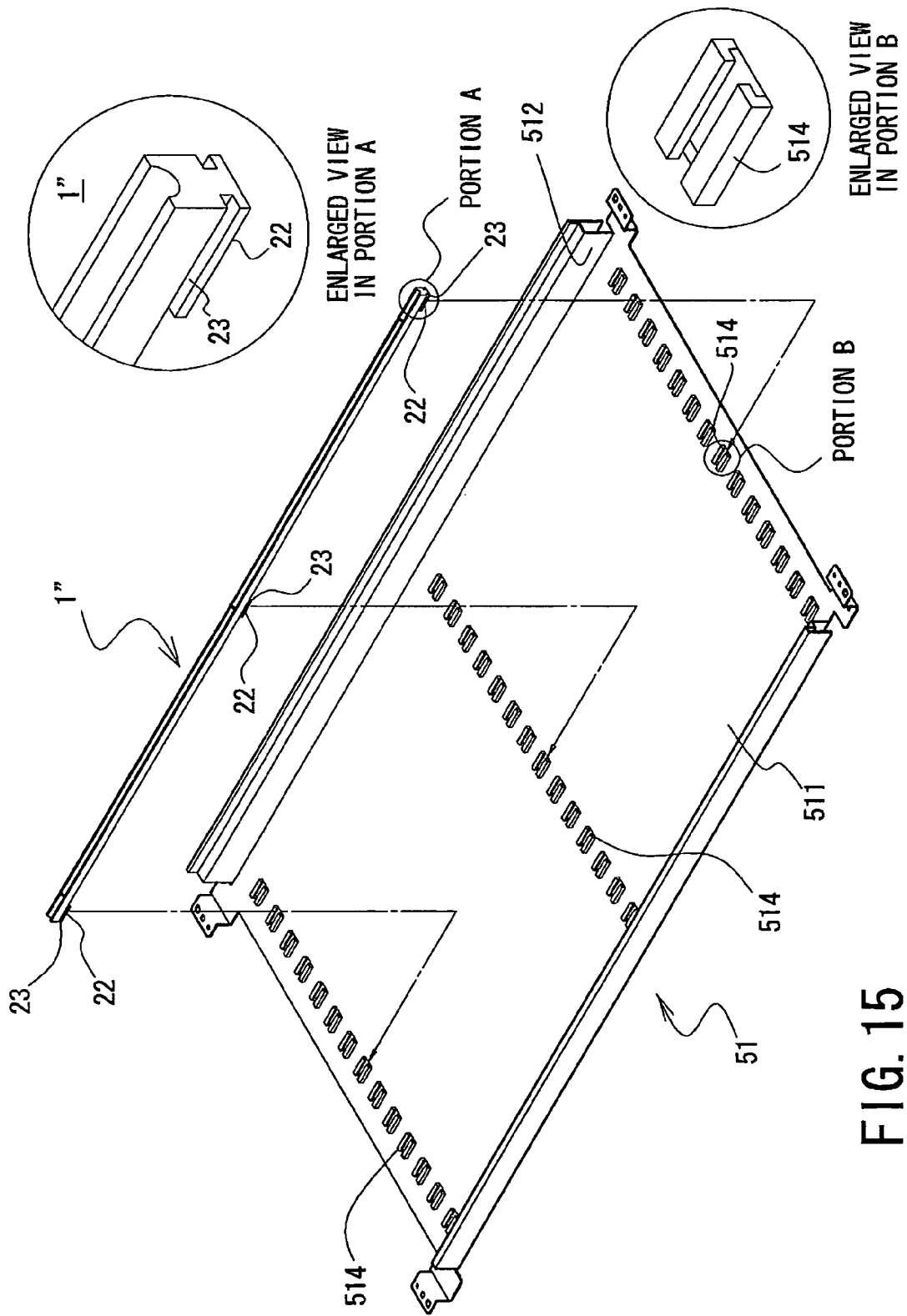
FIG. 15 is a schematic view showing another example of the configuration of fixing a light source holding member which can be used in the light source holding structure according to a preferred embodiment of the present invention to the chassis, and more specifically.

The configuration of attaching the light source holding members 1a to 1k and 1' to the chassis 51 is not limited to the combined use of the split first locking portions 12 and the locking holes 513 as described above. FIG. 15 is a schematic view showing an example of attaching a light source holding member 1" to the chassis 51. To be specific, FIG. 15 is an exploded perspective view schematically showing the configuration of the chassis 51 and the light source holding member 1", including a partial enlarged view of the light source holding member 1" in the portion A and a partial enlarged view of the chassis 51 in the portion B.

As shown in FIG. 15, the light source holding member 1" has projections 22 extending toward the back side in given positions. The light source holding member 1" has engaging grooves 23 on lateral surfaces of the projections 22 along the entire length of the light source holding member 1". The chassis 51 has locking projections 514 in positions on the bottom plate 511 which positions correspond to the projections when the light source holding member 1" is placed on the bottom plate 511. The locking projections 514 are capable of being caught in the engaging grooves 23 of the projections of the light source holding member 1". As indicated by the arrows in FIG. 15, the engaging grooves 23 of the projections 22 of the light source holding member 1" are slid in and engage with the locking projections 514 of the chassis 51. Thus, the light source holding member 1″ is attached to the chassis 51.

Figure 16:
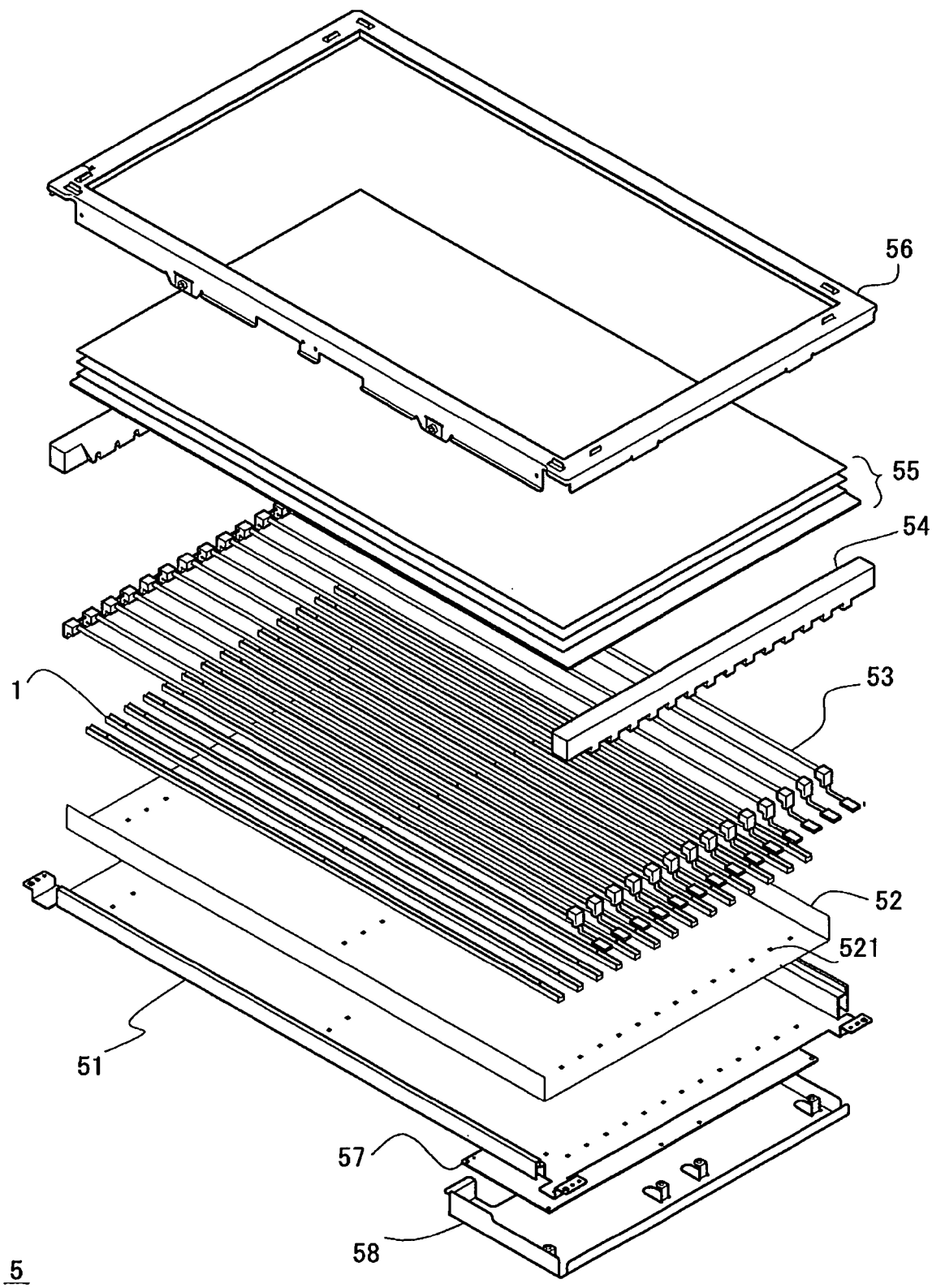
FIG. 16 is an exploded perspective view schematically showing the configuration of the relevant portion of the light source unit for the display device according to a preferred embodiment of the present invention.

Next, a description of a light source unit for a display device according to a preferred embodiment of the present invention is given. A light source unit 5 for a display device according to a preferred embodiment of the present invention incorporates the light source holding structure using any one of the above-described light source holding members. FIG. 16 is an exploded perspective view schematically showing the configuration of the relevant portion of the light source unit 5 for the display device according to the preferred embodiment of the present invention. In FIG. 16, the front side of the light source unit 5 faces toward the top of FIG. 16, and the back side faces toward the bottom of FIG. 16.

As shown in FIG. 16, the light source unit 5 for the display device according to a preferred embodiment of the present invention has the chassis 51, the plurality of light sources 53, light source holding members 1 (herein after, the light source holding member 1 represents any one of the above-described light source holding members), a reflection sheet 52, side holders 54, optical sheets 55, a frame 56, a light source driving circuit board 57, and a light source driving circuit board cover 58.

The reflection sheet 52, the light sources 53, the side holders 54, the optical sheets 55, the frame 56, the light source driving circuit board 57, and the light source driving circuit board cover 58 may be conventional ones, and therefore, brief descriptions thereof are given and detailed descriptions thereof are omitted.

The chassis 51 is in the shape of a shallow tray and is preferably prepared by subjecting a metal plate material to press working. The chassis 51 has the bottom plate 511 substantially in the shape of a square. The chassis 51 has the side walls 512 standing toward the front side at the outer edges of the bottom plate 511 which edges extend parallel or substantially parallel to the axial direction of the light sources 53 (i.e., the longer edges of the bottom plate 511).

The locking holes 513 (or the locking projections 514) capable of locking the light source holding member 1 are provided in given positions on the bottom plate 511 of the chassis 51 (not shown in FIG. 16, see FIG. 1 or 15).

The reflection sheet 52 preferably is a sheet-shaped or plate-shaped member having a surface property of reflecting light emitted by the light sources 53 diffusely. The reflection sheet 52 is preferably made of expanded polyethylene terephthalate. The reflection sheet 52 has openings 521 in positions which correspond to the locking holes 513 on the bottom plate 511 of the chassis 51 when the reflection sheet 52 is placed on the front side of the bottom plate 511 of the chassis 51.

The side holders 54 function as spacers for the optical sheets 55 to be described later. The side holders 54 are substantially in the shape of a bar and are preferably unitary molded members made of a resin material.

The optical sheets 55 are preferably defined by a sheet-shaped or plate-shaped member arranged to control the property of light emitted by the light sources 53, or an assembly of such members. The optical sheets 55 preferably include a diffusion sheet arranged to diffuse light transmitted, a polarizing reflection sheet arranged to transmit light polarized in a given direction and reflect other light, and a lens sheet arranged to collect light. In general, a stack of these sheets in a given order is used.

The frame 56 holds and/or protects the optical sheets 55 and a display panel which is described later. The frame 56 preferably is substantially in the shape of a square picture frame with an opening. The frame 56 may preferably be a unitary molded member made of a resin material, an assembly of components made of a resin material, a metal plate material subjected to press working, or an assembly of components prepared by subjecting a metal plate material to press working, for example.

On the light source driving circuit board 57, electronic and/or electric circuits arranged to drive the light sources 53 are provided. The light source driving circuit board cover 58 is a covering element arranged to cover the light source driving circuit board 57 and is preferably made of a metal plate material.

A description of the assembly structure of the light source unit 5 for the display device having the constituent elements as described above is given.

First, the reflection sheet 52 is laid on the front side of the bottom plate 511 of the chassis 51, and the light source holding members 1 are attached thereto. Because the reflection sheet 52 has the openings 521 as described above, the first locking portions 12 of the light source holding members 1 can be caught in the locking holes 513 on the chassis 51 by inserting the first locking portions 12 through the openings 521 of the reflection sheet 52. In the combined use of the projections 22 having the engaging grooves 23 of the light source holding members 1 and the locking projections 514 on the bottom plate 511 of the chassis 51, the engaging grooves 23 of the projections 22 of the light source holding members 1 engage with the locking projections 514 extending toward the front side through the openings 521 of the reflection sheet 52.

Then, the light sources 53 are placed on the front side. To be specific, the light sources 53 are held by the light source holding members 1 attached to the chassis 51. Thus, the light sources 53 are fixed to the chassis 51.

In this state, the side holders 54 are attached to the shorter edges of the chassis 51 to cover the end portions of the light sources 53. Then, the optical sheets 55 are placed on the front side. To be specific, the four edges of the optical sheets 55 are placed on the front surfaces of the side walls 512 of the chassis 51 and the side holders 54. Then, the frame 56 is attached to the front side. The light source driving circuit board 57 is placed on the back side of the chassis 51 to electrically connect the light source driving circuit board 57 and the light sources 53. Then, the light source driving circuit board cover 58 is attached thereto to cover the light source driving circuit board 57.

As a result, the light source unit 5 according to a preferred embodiment of the present invention is obtained.

Figure 17:
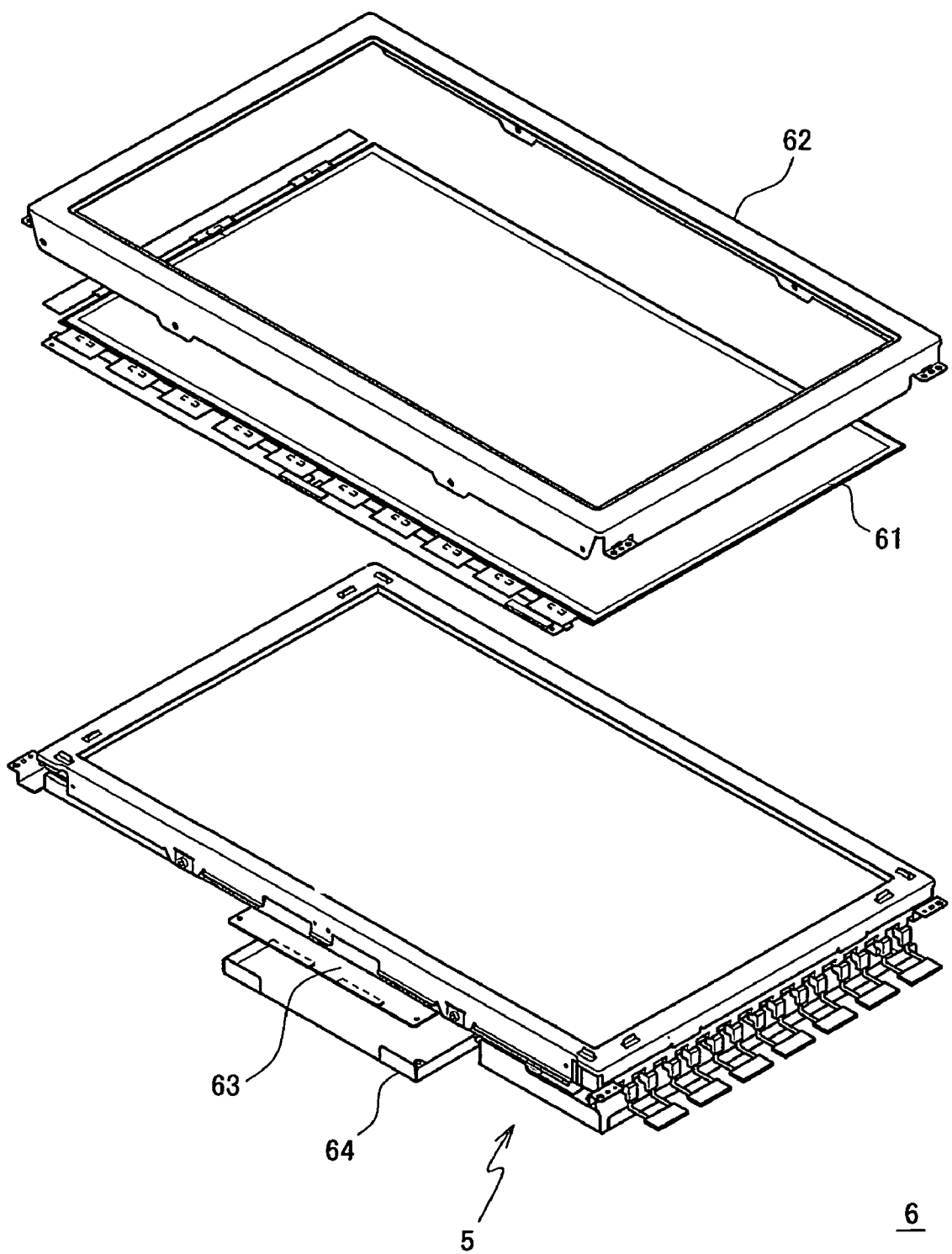
FIG. 17 is an exploded perspective view schematically showing the configuration of the relevant portion of a display device having the light source unit for the display device.

Next, a description of a display device having the light source unit 5 for the display device is given. FIG. 17 is an exploded perspective view schematically showing the configuration of the relevant portion of a display device 6 having the light source unit 5 for the display device.

As shown in FIG. 17, the display device 6 has the light source unit 5 for the display device according to a preferred embodiment of the present invention, a display panel 61, a bezel 62, a control circuit board 63, and a control circuit board cover 64.

For the display panel 61, various conventional translucent display panels may be used, and an active matrix type liquid crystal display panel is preferably used. The bezel 62 holds and/or protects the display panel 61 and is a member substantially in the shape of a square picture frame with an opening. On the control circuit board 63, electronic and/or electric circuits arranged to produce various signals to drive the display panel 61 are provided. The control circuit board 63 produces various signals based on an image signal inputted from the outside (e.g., from a tuner). The control circuit board cover 64 covers the control circuit board 63 and is preferably made of a metal plate material.

A description of the assembly structure of the display device 6 is given. The display panel 61 is placed on the front side of the frame 56 of the light source unit 5. The control circuit board 63 is placed on the back side of the chassis 51 of the light source unit 5. A circuit board, which is attached to the display panel 61, and the control circuit board 63 are connected to each other to enable sending and receiving various signals. The bezel 62 is attached to the front side of the display panel 61. The control circuit board cover 64 is attached to cover the control circuit board 63.

Figure 18:
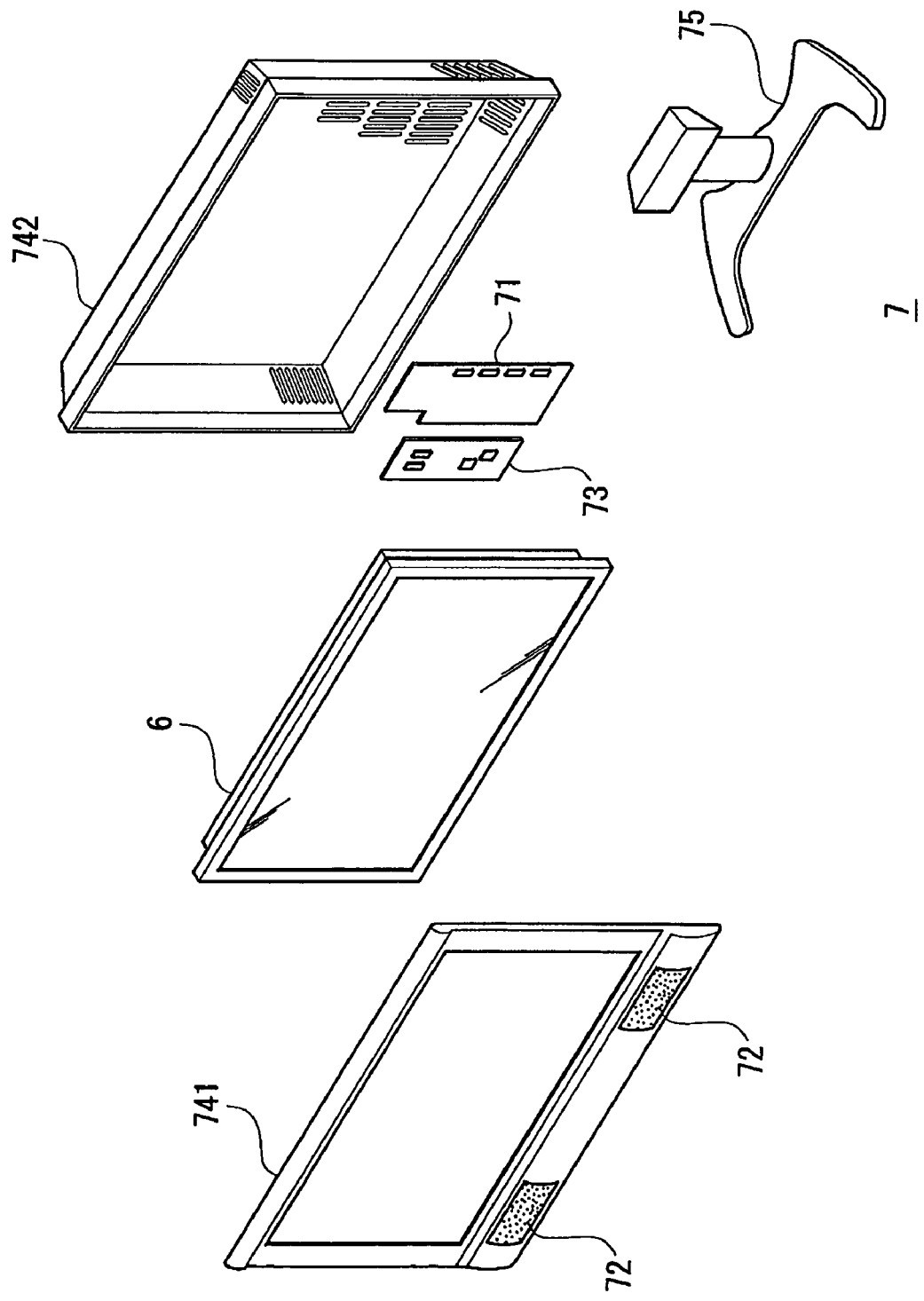
FIG. 18 is an exploded perspective view schematically showing the configuration of a television receiver including the display device.
Figure 19:
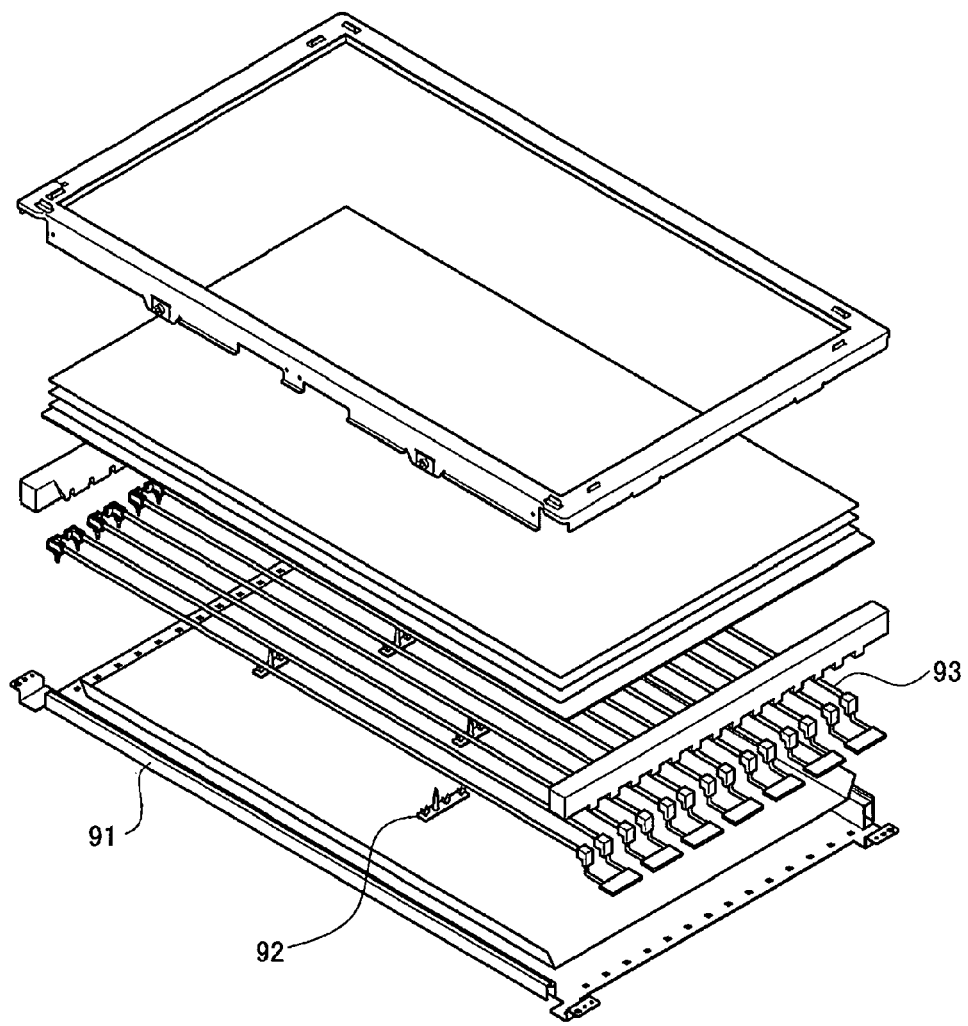
FIG. 19 is an exploded perspective view schematically showing a conventional example of the configuration of the relevant portion of a light source unit for a display device in which a plurality of light sources are incorporated.

Next, a description of a television receiver having the display device 6 is given. FIG. 18 is an exploded perspective view schematically showing the configuration of the relevant portion of a television receiver 7 having the display device 6. As shown in FIG. 18, the television receiver 7 has the display device 6, a tuner 71, loudspeaker mechanisms 72, an electric power supply 73, a cabinet 741, 742, and a supporting member 75. For the tuner 71, the loudspeaker mechanisms 72, the electric power supply 73, the cabinet 741, 742, and the supporting member 75, conventional ones may be used. Therefore, brief descriptions thereof are given, and detailed descriptions thereof are omitted.

The tuner 71 produces an image signal and a sound signal of a given channel based on received radio waves. For the tuner 71, a conventional terrestrial tuner (analog, digital), a BS tuner, or a CS tuner can be used. The loudspeaker mechanisms 72 produce a sound based on the sound signal produced by the tuner 71. For the loudspeaker mechanisms 72, generally used speakers may be used. The electric power supply 73 can supply electric power to the display device 6, the tuner 71, and the loudspeaker mechanisms 72.

The display device 6, the tuner 71, the loudspeaker mechanisms 72, and the electric power supply 53 are housed in the cabinet 741, 742, and the cabinet 741, 742 is supported by the supporting member 75. In FIG. 18, the cabinet 741, 742 preferably includes a front side cabinet 741 and a back side cabinet 742, and between the front and back side cabinets 741 and 742, the display device 6, the tuner 71, the loudspeaker mechanisms 72, and the electric power supply 73 are housed. The tuner 71, the loudspeaker mechanisms 72, and the electric power supply 73 may be mounted on the display device 6.

The foregoing descriptions of the preferred embodiments and the implementation example of the present invention have been presented for purposes of illustration and description with reference to the drawings. However, it is not intended to limit the present invention to the preferred embodiments, and modifications and variations are possible as long as they do not deviate from the principles of the present invention.

In the above-described preferred embodiments of the present invention, linear fluorescent tubes are used as the light sources. However, substantially U-shaped fluorescent tubes may be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A light source holding structure for holding a linear light source, the light source holding structure comprising:
   a linear light source; and
   a light source holding member substantially in the shape of a bar; wherein
   the linear light source is held by the light source holding member; and
   at least a portion of an outer surface of substantially an entire length of the linear light source is in contact with the light source holding member.

2. The light source holding structure according to claim 1, wherein the outer surface of the linear light source is in surface contact with the light source holding member.

3. The light source holding structure according to claim 1, wherein a length of the light source holding member is substantially equal to a length of the linear light source, and the linear light source is held by one light source holding member and substantially the entire length of the linear light source is in contact with the one light source holding member.

4. The light source holding structure according to claim 1, wherein a length of the light source holding member is shorter than a length of the linear light source, the light source holding member is provided in a plurality, and the plurality of light source holding members are arranged in series, and
   one light source is held by the plurality of light source holding members arranged in series and substantially the entire length of the one light source is in contact with the plurality of light source holding members.

5. The light source holding structure according to claim 1, wherein a contact area between an outer surface in an end portion of the linear light source and the light source holding member is larger than a contact area between an outer surface in other portion of the linear light source and the light source holding member.

6. A light source unit comprising:
   a linear light source;
   a chassis; and
   the light source holding structure according to claim 1; wherein
   the linear light source is fixed to the chassis by being held by the light source holding structure.

7. A display device comprising:
   a display panel; and
   the display unit according to claim 6.

8. A light source holding member for holding a linear light source, the light source holding member being substantially in the shape of a bar and comprising:
   a concave engaging groove extending substantially an entire length of the light source holding member in a longer dimension direction, and capable of engaging with at least a portion of an outer surface of the linear light source.

9. The light source holding member according to claim 8, wherein a depth of the engaging groove in an end portion of the light source holding member in the longer dimension direction is deeper than a depth of the engaging groove in other portion of the light source holding member.

10. The light source holding member according to claim 8, further comprising a side wall at a side of the engaging groove, the side wall extending along substantially the entire length of the light source holding member in the longer dimension direction and arranged to lock the linear light source.

11. The light source holding member according to claim 10, wherein a height of the side walls in an end portion of the light source holding member in the longer dimension direction is higher than a height of the side walls in another portion of the light source holding member.

12. The light source holding member according to claim 8, further comprising a plurality of side walls at a side of the engaging groove, the side walls being continuously provided along substantially the entire length of the light source holding member in the longer dimension direction and arranged to lock the linear light source.

13. The light source holding member according to claim 12, wherein a height of the side walls in an end portion of the light source holding member in the longer dimension direction is higher than a height of the side walls in another portion of the light source holding member.

14. The light source holding member according to claim 12, wherein a pitch of the side walls in an end portion of the light source holding member in the longer dimension direction is smaller than a pitch of the side walls in another portion of the light source holding member.

15. The light source holding member according to claim 8, wherein the light source holding member is a unitary molded member made of a resin material.

16. The light source holding member according to claim 8, further comprising a heat conduction member arranged to transfer heat of the end portion of the linear light source to a central portion of the linear light source.

17. The light source holding member according to claim 16, wherein the heat conduction member is embedded in the light source holding member and is exposed in the end portion and the central portion of the light source holding member in a longer dimension direction so as to be capable of being brought into contact with the outer surface of the held linear light source.

18. A light source unit comprising:
a linear light source;
a chassis; and
the light source holding member according to claim 8; wherein
the linear light source is held by the light source holding member; and
the light source holding member is attached to the chassis.

19. A light source holding member for holding a linear light source, the light source holding member comprising:
a base substantially in the shape of a bar; and
a plurality of locking portions arranged to elastically engage with an outer surface of the linear light source; wherein
the plurality of locking portions are continuously arranged along substantially an entire length of the light source holding member.

20. The light source holding member according to claim 19, wherein a length of at least one of the plurality of locking portions in an end portion of the base in a longer dimension direction is greater than a length of the other locking portions in another portion of the base.

21. The light source holding member according to claim 19, wherein a pitch of at least one of the plurality of locking portions in an end portion of the base in a longer dimension direction is smaller than a pitch of the other locking portions in another portion of the base.

* * * * *